US012586129B1

(12) United States Patent
Scheerer et al.

(10) Patent No.: US 12,586,129 B1
(45) Date of Patent: Mar. 24, 2026

(54) DUAL BAND DETECTION AND INVALIDATION OF ERRONEOUS REQUEST MESSAGES

(71) Applicant: Chicago Mercantile Exchange Inc., Chicago, IL (US)

(72) Inventors: John Paul Scheerer, Frankfort, IL (US); Matthew Wayne Haynes, Chicago, IL (US); Francis Michael Cismoski, Mokena, IL (US); Andrew Peter Paso, Chicago, IL (US); Supreet Dhillon, Northbrook, IL (US); Paul Alan Millhuff, Tinley Park, IL (US); David Earl Swanson, Aurora, IL (US); James Allen Bailey, Western Springs, IL (US); Michal Pawel Rys, Elk Grove Village, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 278 days.

(21) Appl. No.: 17/738,406

(22) Filed: May 6, 2022

(51) Int. Cl.
    *G06Q 40/04* (2012.01)
(52) U.S. Cl.
    CPC .................................. *G06Q 40/04* (2013.01)
(58) Field of Classification Search
    CPC .................................................... G06Q 40/04
    See application file for complete search history.

(56) References Cited

U.S. PATENT DOCUMENTS

| | | | |
|---|---|---|---|
| 8,660,936 B1 | 2/2014 | Banke | |
| 10,726,485 B2 | 7/2020 | Scheerer et al. | |
| 10,783,532 B2 | 9/2020 | Lustyk et al. | |
| 2015/0170273 A1 | 6/2015 | Barry et al. | |
| 2016/0196606 A1* | 7/2016 | Damodaran | G06Q 40/04 |
| | | | 705/37 |
| 2017/0293973 A1* | 10/2017 | Lustyk | G06Q 40/04 |
| 2017/0293974 A1* | 10/2017 | Konduru | G06Q 40/06 |
| 2020/0402169 A1* | 12/2020 | Bonig | G06N 20/00 |

OTHER PUBLICATIONS

"GCC Price Banding", CME Group, https://www.cmegroup.com/confluence/display/EPICSANDBOX/GCC+Price+Banding, available as early as Feb. 11, 2022, 3 pages.
"Limits and Banding", CME Group, available as early as Feb. 11, 2022, https://www.cmegroup.com/confluence/display/EPICSANDBOX/Limits+and+Banding, 6 pages.
"What are Price Limits and Price Banding?", CME Group, available as early as Feb. 11, 2022, https://www.cmegroup.com/education/courses/introduction-to-futures/price-limits-price-banding.html, 2 pages.

* cited by examiner

*Primary Examiner* — Elda G Milef
(74) *Attorney, Agent, or Firm* — Lempia Summerfield Katz LLC

(57) ABSTRACT

A system may receive electronic request messages from various sources. The electronic request messages may include request operations for a first object. In some cases, the request operations may be inaccurate. Inaccurate request operations may be detected by extracting data indicative of value for the request operations from the electronic request messages. The data indicative of value may be compared to a band including a range of accurate values for the request operations for the first object. The data indicative of value may be compared to a second band including a range of accurate values for the request operations for a second object with a defined relationship to the first object.

21 Claims, 7 Drawing Sheets

DUAL BAND DETECTION AND INVALIDATION OF ERRONEOUS REQUEST MESSAGES

BACKGROUND

Computing systems, such as data transaction processing systems, often process data objects which are associated with values derived from or otherwise submitted or provided by external sources. Incoming request messages related to the data objects may include requests to perform actions on the data objects at specified values. Whether or not the attempted actions are executed or performed depends in part on the values submitted with the incoming request messages and/or the rules and processing routines programmed into a data transaction processing system.

One example of an environment including data objects having specified values is an electronic trading system wherein the values may be submitted by participants. Another such example includes tokenized requests for code validation in a blockchain-based peer-to-peer network (e.g., such as transaction requests using 'Gas' on the Ethereum network) where participants may attach tokens to a request to increase/decrease execution priority. In these systems, some changes to the value of an object may be undesirable or based on incomplete or inaccurate data.

Improvements in the identification and invalidation of erroneous and/or otherwise inaccurate request messages may continue to improve user experience and drive adoption of such systems.

DETAILED DESCRIPTION

Figure 1:
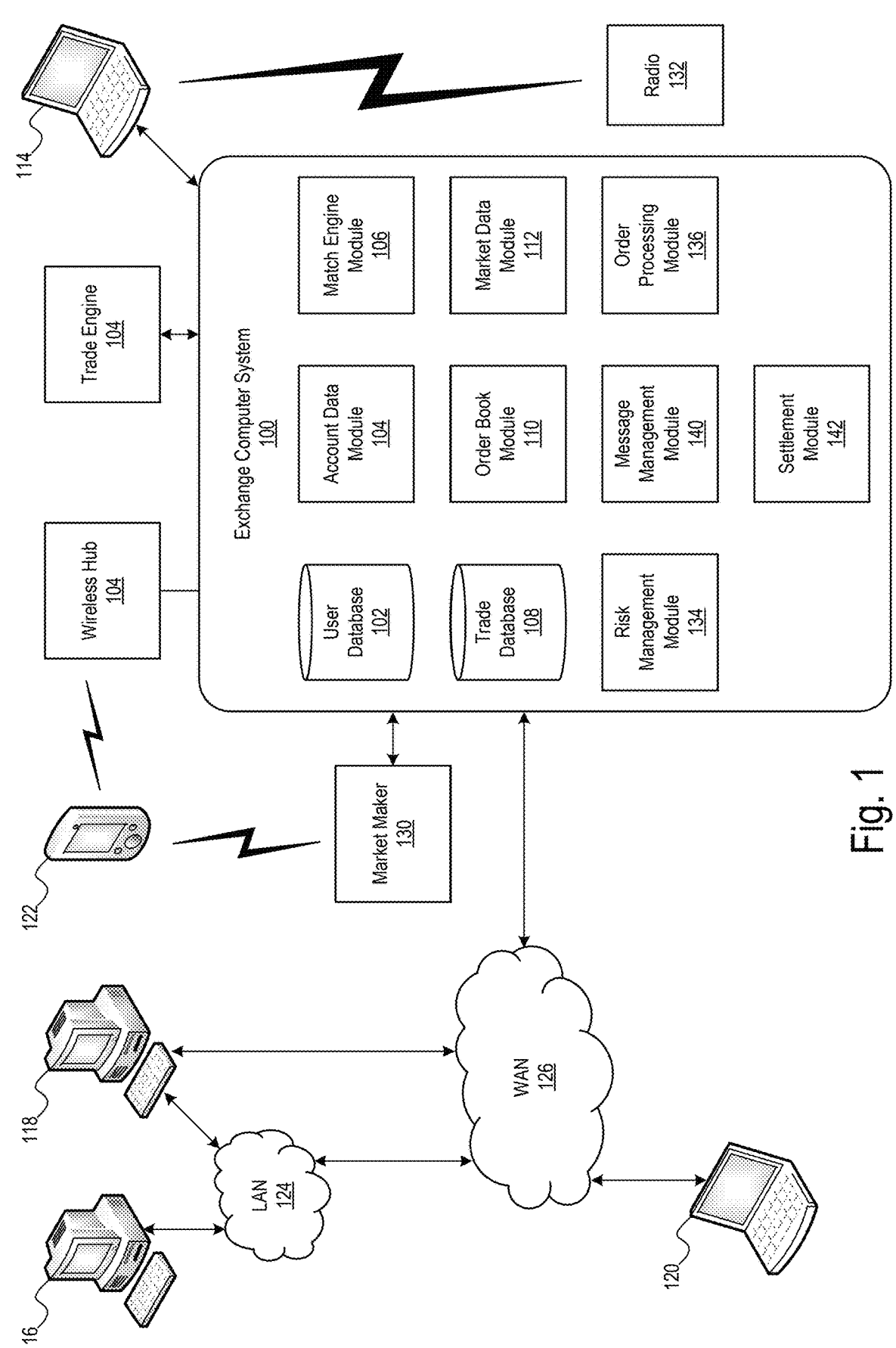
FIG. 1 shows an illustrative computer network system for use with various implementations.

In various electronic messaging contexts, inaccurate request operations may include or be based on inaccuracies, such as, inaccurate information, input errors, transcription errors, out-of-date information, or information otherwise not consistent with current consensus. Nevertheless, such request operations may be executed when the inaccuracies remain undetected during processing. This may lead to reduced user experience where inaccuracies are identified after an inaccurate request operation that cannot be undone is executed or where an inaccurate request operation causes interference with other nominally accurate request operations. Further, when undetected, inaccurate request operations can affect the consensus surrounding the objects targeted by the request operation. This may lead to transient situations in which the various measures of the consensus may themselves be inaccurate/unreliable or to transient situations where consensus cannot be ascertained. Accordingly, for technical systems displaying consensus measures or implementing tools that rely on consensus measures, the accuracy and efficiency of the system may depend on technical detection of request operations based on (or including) inaccuracies.

As an example context, incoming transaction request operations in an electronic trading system may include requests for transaction on financial products at various values (e.g., prices). When the price set for the transaction in the request operation is within the consensus range, the request operation itself may be said to be within the consensus range. One characteristic of many inaccurate request operations is that they may be outside various determined ranges of the consensus. Thus, the inaccurate request operations may be detected and invalidated by using a value band (e.g., a range) defining valid request operations, e.g., request operations (with values) inside the value band being valid, request operations outside the band may be defined to be invalid. Using such band discrimination, a system may "tune" (in some ways, similar to radio tuner) to, or otherwise discriminate among, request operations within and/or near a range of consensus and "tune out" inaccurate (or likely inaccurate request operations) outside and/or far from the range of consensus. The use of bands allows for the detection of inaccurate request operations without inhibiting shifts or movements of the consensus to different ranges as conditions change.

In various implementations, the range of consensus may be updated based on a collective analysis (e.g., averaging, defining a band based on distance from a center value, statistical analysis, and/or other multiple request operation analysis) of request operations found to be within the band. Thus, in some implementations, the range of consensus may change over time.

Using (single) band enforcement, the analysis for determining the range of consensus may exclude some inaccurate request operations. However, in some cases, determination of the band solely on request operations for the target object covered by that band may result in one or more (in some cases a series of) inaccurate request operations pushing a deterministic calculation of the band to reflect the inaccurate request operations rather than actual consensus ranges for the target objects. In various contexts, this problem is particularly acute for systems where a base band for a base object is determined based on a comparatively large volume of request operations and a related band for a related object is independently determined based on a selected smaller volume of request operations for the related object. In some cases, despite the base object and related object having a relationship to one another, their respective bands may deviate from one another when determined independently. Still, some amount of deviation between bands for base objects and related objects may be warranted. Because the base object and related object are not identical, they must differ in at least one respect. Accordingly, that difference may warrant some dynamism in their relationship. The techniques and architectures discussed herein provide a technical solution to the technical problem of non-consensus band deviation while allowing for bands to float with respect to one another within a defined range. The increased accuracy of band determination increases the accuracy and efficiency with which the underlying hardware operates. Specifically, the accurate band placement increases the accuracy of error detection within request operations (e.g., increases the accuracy with which inaccurate request operations are identified). Consequently, the efficiency of the hardware operation is increased because the processing of inaccurate request operations may be aborted once errors are identified. The use of multiple bands provides an improved request operation filter that allows for detection of inaccurate requests in dynamic conditions where the accurate consensus measures may be temporary unavailable for one or more object types, while still allowing for shifts in filtering range that reflect changes in real world conditions.

To implement dual (or otherwise multiple) band analysis of request operations, technical options may be selected. Technical options for an implementation may affect various technical implementation characteristics. For example, a technical option may affect how, when, and what memory locations are accessed, which operations are performed on the data stored in those memory locations, and which order such operations are performed. Technical options may affect operation efficiency, calculation accuracy, computational load, memory usage, and various other technical characteristics. Thus, technical options further improve the operation of the underlying hardware. For the purposes of illustration, two example technical options are discussed below.

Dual Band Application Option—As an example of a technical option for implementation of a multiple band analysis (referring to the examples of the base object and related object discussed above), a related request operation for a related object may be analyzed by comparing the related request operation to the base band and the related band. When then related request operation is outside either band, the related request operation is invalidated. This example technical option may involve accessing memory locations for a related value associated with the related request operation, the base band, and the related band; comparing the related value to the base band to determine whether the request operation is within the base band; and comparing the related value to the related band to determine whether the request operation is within the related band. This technical option may involve repetition of the same type of operation (e.g., range comparison) on a value from a single memory location.

Band Deviation Threshold Option—As an example of a technical option for implementation of a multiple band analysis (referring to the examples of the base object and related object discussed above), a related request operation for a related object may be analyzed by comparing the related request operation to the related band. Then, the related band may be recalculated to determine an adjustment to the related band that would occur if the related request operation were found valid. The related band with the adjustment may be compared to the base band, if the adjustment to the related band would cause more than a threshold deviation between the bands (e.g., overlap below a threshold percentage, deviation between center values, or other pre-defined above-threshold deviation) the related request operation that may be invalidated. In various cases, the band deviation threshold option may rely on calculation of a band value that may be found to be above threshold and rejected. Accordingly, this technical option may increase processor load and memory usage relative to the dual band application option (which may reject request operations prior to calculation of the effect on the related band). However, the band deviation threshold option compares the related band to the base band rather than direct comparison of an individual request operation to the base band. Accordingly, using the band deviation threshold option may allow for individual request operation details to be quarantined into protected memory zones (even in cases when the base band comparison would be performed outside such a protected memory zone).

As an illustrative scenario, the base band may correspond to base object including financial product maintained by a third-party organization. The related object may include a local recreation of the base object. In some cases, it may be undesirable to share individual request operation information with the third party. Thus, the band deviation threshold option may solve the technical problem of how to perform a comparison between the base band and (at least the effects of) request operations for the related object without moving sensitive data outside of a protected memory zone for provision to the third party.

The dual band application option may operate without reliance in intermediate determination of bands and does not necessarily require storage for calculated band values that may be later determine invalid. Accordingly, the dual band application option may operate without necessarily reserving temporary memory space for calculation of related band effects from a related request operation that may not necessarily be valid.

The dual band application option also may identify different inaccurate request operations from the band deviation threshold option. Since individual request operations are compared to the base band in the dual band application option, some request operations that would be outside the base band but would not necessarily cause an above-threshold change to the related band. Such request operations may be invalidated using the dual band application option but allowed using the dual band application option. Accordingly, the technical option may affect the detection rate and/or detection accuracy for inaccurate request operations.

Various technical options are possible, including technical options that blend at least some features from the illustrative dual band application option and band deviation threshold option discussed above.

As an illustrative context for the techniques and architectures discussed herein, one exemplary environment where inaccurate request operation detection and mitigation is desirable is in financial markets, and in particular, electronic financial exchanges, such as a futures exchange, such as the Chicago Mercantile Exchange Inc. (CME). A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Such standardization may improve the liquidity of these contracts, e.g. the case with which such contracts may be bought or sold. In implementations described herein, terms and conditions of each futures contract may be partially standardized as to the specification of the contract's underlying reference commodity and attributes thereof. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Physical settlement requires actual delivery of the underlying asset according to the contract terms. Cash settlement, by contrast, is a method of settling a futures contract whereby the parties effect final settlement when the contract expires by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty, as is done with bilateral trading. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the clearing house.

Electronic financial instrument trading systems may allow traders to submit orders (or other request operations) and receive confirmations, market data, and other information electronically via a network. These "electronic" marketplaces implemented by, and also referred to as, "electronic trading systems," are an alternative trading forum to pit based trading systems whereby the traders, or their representatives, all physically stand in a designated location, i.e. a trading pit, and trade with each other via oral and hand based communication.

The speed at which trades are executed through electronic trading systems provide many benefits. Electronic trading systems can facilitate a large number of market transactions. The greater the number of market transactions, the greater a market's liquidity. In liquid markets, prices are driven by competition, prices reflect a consensus of an investment's value, and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

Unfortunately, this improved speed and efficiency also increases the speed at which problems may occur and propagate, such as where the market, e.g., for a transient period, ceases to operate as intended, i.e., the market no longer reflects a true consensus of the value of traded products among the market participants. Such problems are typically evidenced by extreme market activity such as large and/or rapid changes in price, whether up or down, over a short period of time, or an extreme volume of trades taking place.

In particular, traders, whether human or electronic, may not always react in a rational manner, such as when presented with imperfect information. For example, while communications technologies may have improved, imbalances in access to information and opportunities to participate still exist, e.g., some traders receive information before other traders due to external uncontrollable network effects, or some traders may be able to process received information and/or place trader orders more quickly than others. In many cases, certain trader behavior may be triggered by a market event, such as a change in price, creating a feedback loop where the initial reaction may then cause further market events, such as a continued price drop, triggering further similar behavior and an extreme change in the price of the traded product in a short period of time. High speed trading may highlight these effects as there may be little time for traders, or those overseeing them, to contemplate their reactions and/or take corrective action. Furthermore, improved communications among traders facilitates propagation of similar behaviors in one market to other markets as traders in those other markets react to the results of the behavior.

To mitigate risk and ensure a fair and balanced market, electronic trading systems need to provide mechanisms to rapidly detect and respond to situations where a market is not operating in a fair and balanced manner or otherwise where the market value is not reflective of a true consensus of the value of the traded products among the market participants.

The various ones of the architectures and techniques discussed herein evaluate values associated with messages for certain markets or contracts, which may be implemented as, or represented by and manipulated as, objects, i.e. data objects, in the exchange computing system. For example, the values that are evaluated may be associated with newly received or incoming electronic messages, or with messages previously received by the system, such as electronic messages comprising requests for transactions related to an object received from an external source/sender. In one implementation, an administrator associated with an exchange computing system may determine which messages and values associated therewith are subject to the evaluation and prevention logic disclosed herein.

When applied to electronic trading systems, the techniques and architectures discussed herein, the filter messages according to values associated with actionable instructions (e.g., request operations) within the message. For example, a request to execute a trade at a specific price (e.g., at a specific value). The implementations may then determine whether the request operations comply with the multiple bands If an unacceptable message is detected, the disclosed implementations may respond, e.g., automatically, by taking an action, e.g., a corrective or responsive action, such as notifying the operator of the exchange, such as the Global Control Center ("GCC") of the Chicago Mercantile Exchange ("CME"), invalidating the request operation, aborting processing on the request operation (e.g., by preventing the request operation from being forwarded to match logic), described in more detail below, preventing adjustment to one or more bands in response to the request operation, or other actions, or combinations thereof, to mitigate the effects of the inaccurate message, so as to, for example, ensure that inaccuracies do not propagate beyond their first instance leading to deviations from consensus or capture the increased user satisfaction associated with detecting and invalidating participant errors in lieu of allowing users to face the consequences of such errors.

An exchange computing system may receive conditional orders or messages for a data object, where the order may include multiple prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

In a futures market that has few resting orders but many stop orders, an order executed at a limit price can cause a cascading execution of buy or sell stop orders. The triggering and election of these stop orders can seem almost instantaneous lowering the value of a market in just a few seconds. A problem may occur when one or more trades bring many stop orders into the market. A fast execution of these stop orders may prevent opposite side orders from entering the market, preventing buyers from competing against other buyers and sellers from competing against other sellers. "Stop Price Logic" systems exist to handle extreme market changes due to an undesirable execution of stop orders. See, for example, U.S. Pat. Nos. 8,103,576 and 8,112,347 and U.S. Patent Publication No. 2005/0108141 A1, herein incorporated by reference in their entireties and relied upon.

Some systems focus on the speed of the movement of the market, and detect when a market for a particular product moves too quickly, either up or down, in too short a period of time, e.g., the velocity of the market exceeds a defined threshold limit. See, for example, U.S. Pat. No. 8,660,936, entitled "Detection and mitigation of effects of high velocity price changes" ("the '936 patent"), the entire disclosure of which is incorporated by reference herein and relied upon. See, for further example, U.S. Pat. No. 10,783,532, entitled "Detection and mitigation of effects of high velocity value changes based upon match event outcomes" ("the '532 patent"), the entire disclosure of which is incorporated by reference herein and relied upon.

Velocity logic and stop price logic may invoke anomalous condition messaging. Anomalous condition messaging may include messaging to respond to the acute conditions associated with the invocation of velocity logic and/or stop price logic. For example, anomalous condition messaging may include messaging to participant systems to effect a request halt (e.g., pause announcement messages, transaction rejection messages, pause message prompts, interface button "grey outs", and/or other messaging to interrupt transaction submission and/or execution) such that new request messages requesting transactions involving affected objects are rejected for a period. Due to messaging volume and the acuteness of the conditions, the processing burden and effect on user experience associated with invocation of velocity logic and/or stop price logic may be pronounced. Nevertheless, where invoked, velocity logic and/or stop price logic may stave off user experiences and processing loads less desirable than a contained anomalous condition messaging response. However, systems that prevent the occurrence of anomalous conditions will improve the operation of electronic trading systems by reducing message processing loads and improving user experience.

In one implementation, the anomalous condition messaging may include messaging to effect placement of trading system in a paused or otherwise reserved state (at least with respect to the relevant object), such as for a limited time period which may be configurable and may be a static or dynamic value and may vary among markets. In one implementation, if during the pause state additional conditions, such as based on whether the market is recovering to a normal operating state or not as the paused state is nearing an end, are met, the time limit for staying in paused state may be extended. Alternatively, or in addition thereto, anomalous condition messaging may include transmission of an alert to an operator of the exchange, a trader of the product, or a combination thereof. Alerts may be sent as market data. Where the market is placed in a paused state, the alert may further advise the recipient of this state. A subsequent message may then be sent when the market is taken out of the paused state or if the reserved state is paused. Alternatively, or in addition thereto, the action may include permanent or temporary enablement of opportunities for request operations for an object to be diverted to a different interaction environment. For example, a product may be newly made available for trading through a different market than one undergoing a pause. For example, implied markets for which the current product may be a leg, etc. may be enabled to create additional matching opportunities, i.e. additional liquidity.

In some implementations, anomalous condition messaging may include messaging to effect adjustments to band determination. For example, anomalous condition messaging may be used to change a range of a band for a temporary period or permanently. For example, for a band determined in reference to a center value, anomalous condition messaging may include messaging to reduce value for which the band extends above and below the center value. In some cases, the adjustment may be biased in a particular direction. For example, the extent below or above the center value may be reduced or eliminated while the extent in the other direction from the center value may unaffected. In some cases, this may bias the system towards a previous equilibrium (or other equilibrium).

Alternatively, or in addition thereto, anomalous condition messaging may include messaging to effect modification of the matching/allocation algorithm used to allocate incoming request operations to resting request operations. For example, if the current matching algorithm is First-In-First-Out ("FIFO"), also referred to as Price-Time, the algorithm may be changed to Pro-Rata. Other algorithms which may be used include Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, Split Price-Time Pro-Rata. Sec, for example, U.S. patent application Ser. No. 13/534,399 entitled "Multiple Trade Matching Algorithms" herein incorporated by reference in its entirety and relied upon.

Although "Stop Price Logic" and "Velocity Logic" may operate to protect consensus for a product or grouping of trades, these systems do not address the accuracy of individual request operations (separate from their effects on aggregate conditions). Further, where inaccuracy of an individual request operation may cause invocation of "Stop Price Logic" and "Velocity Logic" (or create the conditions where such invocation is likely to occur), invalidation and processing abortion of such a request operation may prevent the processing load associated with execution of such logic from being unnecessarily expended (e.g., by addressing a technical symptom caused by a related but unaddressed technical problem). Nevertheless, other cases exist where "Stop Price Logic" and/or "Velocity Logic" may appropriately address the underlying technical problem.

Various examples of band analysis are discussed in U.S. Pat. No. 8,666,875, entitled "Determination of banding start price for order evaluation" ("the '875 patent"), the entire disclosure of which is incorporated by reference herein and relied upon. As discussed above, some applications of banding may use a band for a particular object without application of other bands where a relationship among the objects corresponding to the bands may exist. Accordingly, such systems may fail to detect some inaccurate request operations. For example, an inaccurate request operation may be undetected when spurred by one or more previous undetected inaccurate request operations. In such example scenarios, the one or more previous undetected inaccurate request operations may themselves shift the "related" band used to filter the "related" object (to use terms consistent with previous examples). When the determination of the related band proceeds without consideration of the base band (or multiple base bands), the related band may shift unbounded along with the series of inaccurate request operations. Accordingly, inaccurate request operations second or subsequent in the series may be detected when both the related band and base band are considered, but may remain undetected when the base band is omitted from the analysis.

The relationship between the related object and the base object may differ over various implementations. For example, the relationship may include a common product for which the related and base objects represent different contract sizes. The difference may include a contract length and/or terms. The relationship may include a relationship among cryptographic tokens used on a common blockchain system, such as Gas and Ethereum.

In some implementations, the request operations for the related object (even when determined to be valid) may be excluded from use in determining the base band. Determining the base band without regard for the request operations for the related object may run counter the conventional wisdom used in existing systems where request operations for an object are validated based on a band determined using request operations for that object. In some cases, filtering related objects based a base band for which the request operations for the related objects are not considered has the counterintuitive (and unexpected) result of improving tracking of consensus regarding the "related" values associated with the related request operations. Despite the constraint on the information used in determining the base band (e.g., the exclusion of related request operations from the determination), the independence of the base band determination may ensure that movement in the base band consistent with movement in the related band reflects a broader consensus that both the base object and related object have shifted in value (rather than a (likely) transient notion that one or the other has shifted in value independently and contrary to trends present for the other object). Improved tracking of consensus leads to improved performance and adoption of systems.

In various implementations, the base band and related band may be applied symmetrically. In other words, the base band may be used in the analysis and validation of both request operations for the base object and the related object, and the related band may be used in the analysis and validation of both request operations for the base object and the related object.

In various implementations, the base band and related band may be applied asymmetrically. In other words, the base band may be used in the analysis and validation of both request operations for the base object and the related object, but the related band may be used in the analysis and validation of request operations for the related object but not for request operations for the base object. In various cases, the selection of asymmetric or symmetric application of the base and related band may be based on various factors. For example, asymmetric application may be used where the volume of request operations for the base and related object differ. In various cases where the volume of request operations for the base object is larger than that of request operation for the related object, the base band may provide more information regarding the values relevant for related object than the related band provides regarding the values relevant for base object. Accordingly, adding an additional layer of calculation may decrease system performance without a corresponding increase in the accuracy of detection of inaccurate request operations.

A match engine module, such as one implemented by CME, may be centralized and coupled to multiple inputs from customers, and behave deterministically, e.g., programmed to depend on state, inputs and outputs. The rapid speed of automated trading systems implementing such a centralized, deterministic match engine, where all customers or traders can access a central limit order book for a product, can quickly result in a product state that does not reflect a true consensus or desirable state of the product. Accordingly the resulting problem is a problem arising in computer systems due to the high speeds of computer systems. The solutions disclosed herein are, in various implementations, implemented as automatic responses and actions by an exchange computing system computer.

The market parameter(s), or derivations thereof, monitored for movement, the basis for determination of a qualifying magnitude of movement, and/or the duration of the requisite period of time over which a qualifying change may occur, may be configurable, as will be described, and implementation dependent, so as to allow various implementations to balance performance versus the ability to accurately discriminate between extreme movements in the market which are reflective of valid market operation from those that are not.

While various implementations may be described in some examples with respect to a product by product or market by market implementation, e.g. implemented for each market/ order book, it will be appreciated that the disclosed implementations may be applied across markets for multiple products traded on one or more electronic trading systems, such as by monitoring an aggregate, correlated or other derivation of the relevant indicative parameters as described herein.

While various implementations may be described in some examples with respect to futures and/or options on futures trading, it should be appreciated that the disclosed implementations may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed implementations may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer an efficient, fair and balanced market where market prices reflect a true consensus of the value of traded products among the market participants. Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to a request to buy or sell a product in a particular electronic marketplace, and the action associated with the message may indicate that the order is to be placed in the electronic marketplace such that other request operations which were previously placed may potentially be matched to the request operation of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by customers with their brokers, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calcula- tions on open positions and to call for immediate payment of settlement variation. CME's mark-to-the-market settlement system differs from the settlement systems implemented by many other financial markets, including the interbank, Trea- sury securities, over-the-counter foreign exchange and debt, options, and equities markets, where participants regularly assume credit exposure to each other. In those markets, the failure of one participant can have a ripple effect on the solvency of the other participants. Conversely, CME's mark- to-the-market system does not allow losses to accumulate over time or allow a market participant the opportunity to defer losses associated with market positions.

Various implementations recognize that electronic mes- sages such as incoming request messages from market participants, e.g., trade request messages, etc., are sent from market participants, or their representatives, to an electronic trading or market system. For example, a market participant may submit an electronic message to the electronic trading system that includes an associated specific action to be undertaken by the electronic trading system, such as enter- ing a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages, e.g., request messages, may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation mes- sages, or other messages such as market update messages, quote messages, and the like.

Outstanding (unmatched, wholly unsatisfied/unfilled or partially satisfied/filled) orders are maintained in one or more data structures or databases referred to as "order books," such orders being referred to as "resting." and made visible, i.e., their availability for trading is advertised, to the market participants through electronic notifications/broad- casts, referred to as market data messages or feeds. An order book, i.e., an order book database or data structure, is typically maintained for each product, e.g. instrument, traded on the electronic trading system and generally defines or otherwise represents the state of the market for that product, i.e. the current prices at which the market partici- pants are willing buy or sell particular quantities of that product. As such, as used herein, an order book for a product may also be referred to as a market for that product. At any given time, an order book, or the market represented thereby, may be characterized by a state, i.e., the data records stored therein at that time which are indicative of the currently pending orders to buy or sell the particular products at particular quantities, and that state may change over time, i.e., as pending orders to buy/sell are at least partially satisfied by incoming counter orders resulting in updating, e.g., to reflect remaining available quantity, etc., or remov- ing existing data records, as order modifications or cancel- ations are received and/or as new orders are received and data records indicative thereof are created.

A market data feed, also referred to as market data or a market feed, is a compressed or uncompressed real time (with respect to market events), or substantial approximation thereof, data/message stream, i.e., sequence of event gener- ated messages, provided by the Exchange directly, or via a third party intermediary. A market data feed may be com- prised of individual messages, each comprising one or more packets or datagrams, and may carry, for example, pricing or other information regarding orders placed, traded instru- ments and other market information, e.g., data indicative of a change in the state of the order book database, such as summary values and statistical values, or combinations thereof created in real time, e.g., at the time of the change in state or substantially proximate thereto, and may be trans- mitted, e.g. multi-casted, to the market participants using standardized protocols, such as UDP over Ethernet.

More than one market data feed, each, for example, carrying different information, may be provided as will be described. The standard protocol that is typically utilized for the transmission of market data feeds is the Financial Information Exchange (FIX) protocol Adapted for Stream- ing (FAST), aka FIX/FAST, which is used by multiple exchanges to distribute their market data. It will be appre- ciated that other protocols may be used. Pricing/quantity information conveyed by the market data feed may include the prices/quantities, or changes thereto, of resting orders, prices at which particular orders were recently traded and/or quantities thereof, or other information representative of the state of the order book database/market or changes therein at the time that the market data was generated. Separate, directed/private, messages may also be transmitted directly to market participants to confirm receipt of orders, cancel- lation of orders and otherwise provide acknowledgment or notification of matching and other events relevant, or oth- erwise privy, only to the particular market participant.

As may be perceived/experienced by the market partici- pants from outside the Exchange or electronic trading sys- tem operated thereby, the following sequence describes how, at least in part, information may be propagated in such a system and how orders may be processed:

(1) An opportunity is created at a matching engine of the Exchange, such as by placing a recently received but unmatched order, e.g. a data record indicative thereof, on the order book to rest;

(2) The matching engine creates an update reflecting the opportunity, e.g., based on the change in the state of the order book database, and sends it to a feed engine;

(3) The feed engine, also referred to herein as a data publisher, generates an electronic data message com- prising data indicative of the update and multicasts it to all of the market participants to advertise the opportu- nity to trade;

(4) The market participants receive the data message and evaluate the opportunity and each, upon completion of their evaluation, may or may not choose to respond with an electronic trade order message comprising data indicative of a trade order responsive to the resting order, i.e. counter to the resting order;

(5) The Exchange gateway receives any counter orders generated by the market participants, sends confirma- tion of receipt back directly to each submitting market participant, and forwards the received orders to the matching engine; and (6) The matching engine evaluates the received orders and matches the first arriving order against the resting opportunity and a trade is executed. This causes another change in the state of the order book database which may again, trigger this cycle.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

While various implementations may be described in some examples with reference to the CME, it should be appreciated that these implementations are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

While various implementations may be described in some examples with reference to a clearing house or exchange for purposes of enforcing a performance bond or margin requirement, other systems may be used. For example, a market participant may use the disclosed implementations in a simulation or other analysis of a portfolio. In such cases, the settlement price may be useful as an indication of a value at risk and/or cash flow obligation rather than a performance bond. The disclosed implementations may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining", the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed implementations may be incorporated into margin requirement(s) determined by the risk management method or system.

In various implementations, the discussed architectures and techniques may be integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the above-referenced patent.

The implementations may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed implementations, e.g., the market participants, may be referred to by other nomenclature, such as clearing firm or clearing entity, reflecting the role that the particular entity is performing with respect to the disclosed implementations and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B> . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A. B . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some implementations, the risk management module 134 implements one or more aspects of the disclosed implementations, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed implementations.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some implementations, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some implementations, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In various implementations, the message management module 140, as coupled with the order book module 110, may be configured for receiving a plurality of electronic request messages, each of the plurality of messages having an associated action to be executed within a designated period of time having a beginning time and an ending time, wherein at least one electronic request message of the plurality of electronic request messages comprises data representative of a particular time between the beginning and end of the period of time at which the action associated with the at least one electronic request message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 1B provides additional details for the message management module 140.

As will be described, the disclosed multiple-band inaccurate request operation detection system may be implemented as part of the message management module 140 and/or order processing module 136. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed implementations may be implemented as a different or separate module of the exchange computer system 100, or a separate computer system coupled with the exchange computer system 100 so as to have access to margin account record, pricing, and/or other data.

As described above, the disclosed implementations may be implemented as a centrally accessible system or as a distributed system, e.g., where the disclosed functions are performed by a cloud-based deployment, where some of the disclosed functions are performed by the computer systems of the market participants and/or via hardware located at multiple distinct physical locations. In some distributed implementations, a centrally-located processing system may perform band calculations that are distributed to remotely-located regional message receiving nodes. In some cases, differences in transmission latency (and/or other transmission performance factors) may cause the remotely-located regional message receiving nodes receive updates to the bands at different times. In some implementations, this may cause band updates to go into effect at different times. In some implementations, the timing differences may be mitigated by using a defined periodicity to band updates, such that new updates go into effect at synchronized times at each of the remotely-located regional message receiving nodes. In some implementations, band updates may include an instruction specifying a time at which an update will go into effect to allow each of the remotely-located regional message receiving nodes to receive the update and begin enforcement at the specified time.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one implementation, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa.

Figure 1A:
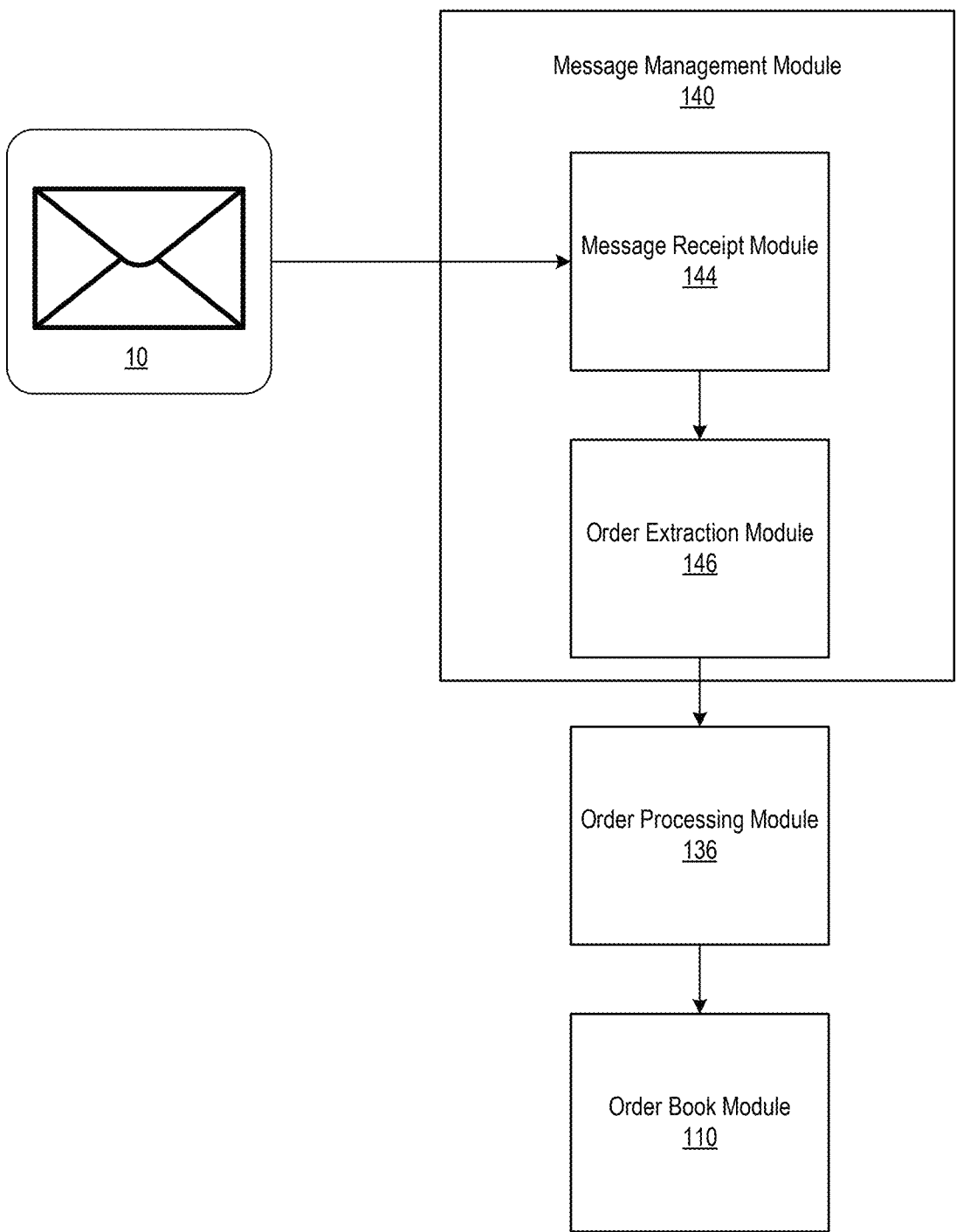
FIG. 1A shows an example market order message management system.

FIG. 1A illustrates an implementation of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an implementation, the order processing module may execute an associated action of placing the order into an order book for an electronic trading system managed by the order book module 110. In an implementation, placing an order into an order book and/or into an electronic trading system may be considered a primary action for an order. The order processing module 136 may be configured in various arrangements, and may be configured as part of the order book module 110, part of the message management module 140, or as an independent functioning module.

The implementations described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one implementation, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

Figure 2:
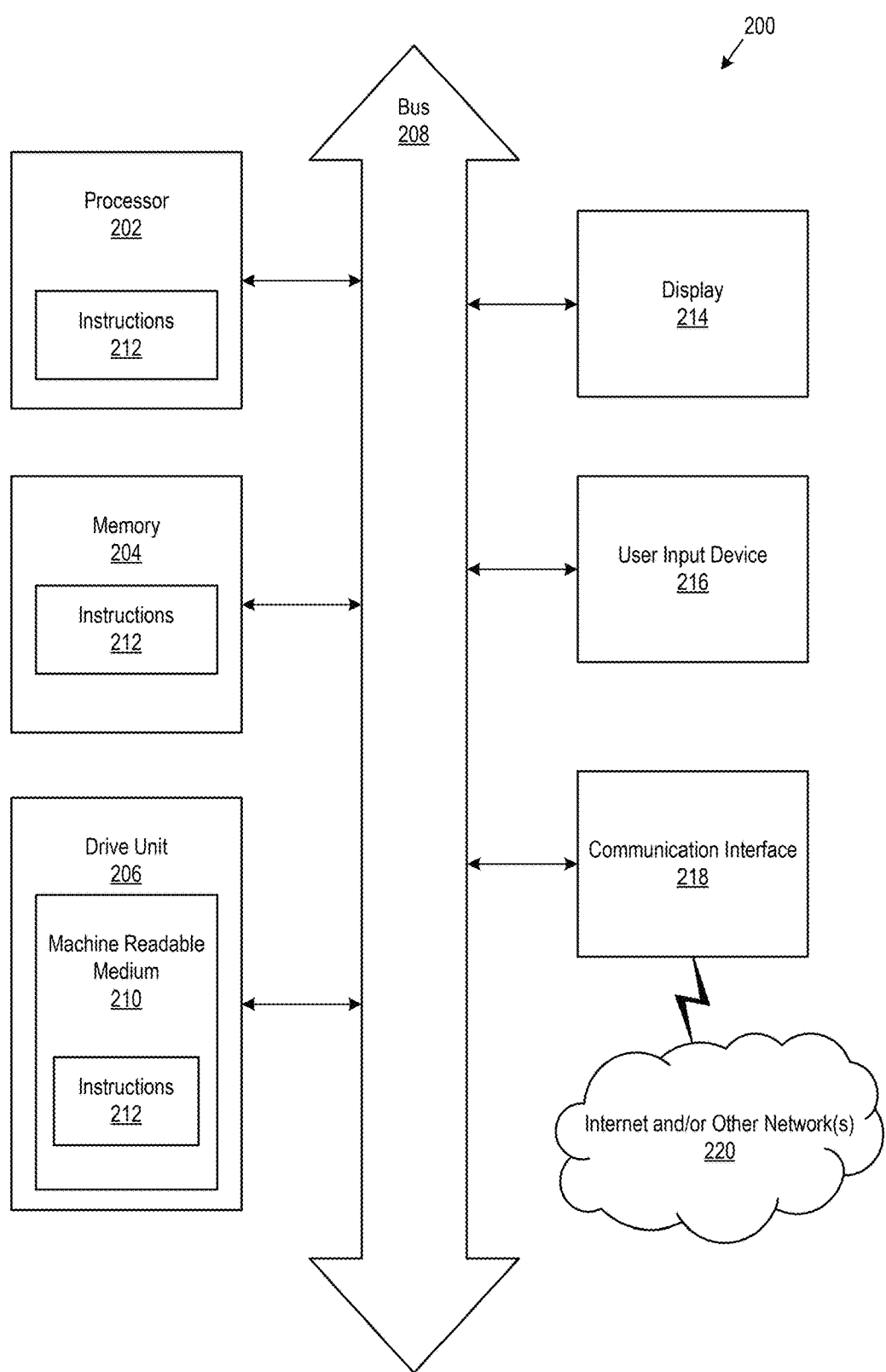
FIG. 2 shows an illustrative implementation of a general computer system configured for use with various implementations.

Referring to FIG. 2, an illustrative implementation of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed implementations are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular implementation, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular implementation, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary implementation, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated or otherwise specifically configured hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the techniques and architectures are not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. The instructions govern the operation of the processor thereby transforming the processor into a special purpose device. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and optical media (CD-ROM, DVD-ROM, Blu-Ray, or other optical media). The processor and the memory can be supplemented by, or incorporated in, special purpose logic circuitry.

To provide for interaction with a user, implementations of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed implementations may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

In an implementation, electronic messages are received from the network. The electronic message packets may be received at a network interface for the electronic messaging system. The electronic messages may be sent from client devices, for example client devices of participants in a market. The messages may include request characteristics and be associated with actions to be executed with respect to a request that may be extracted from the request characteristics. The action may involve any action as associated with transacting the request (which may be, for example, an order in an electronic trading system). The actions may involve placing the orders within a particular market and/or order book of a market in the electronic trading system.

In various implementations, a market may operate using characteristics that involve collecting orders over a period of time, such as a batch auction market. In such an implementation, the period of time may be considered an order accumulation period. The period of time may involve a beginning time and an ending time, with orders (or other request operations) placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an implementation, the other data may be data indicating a particular time in which the action is to be executed. As such, the order may be considered a temporally specific order. The particular time in which an action is undertaken may be established with respect to any measure of absolute or relative time. In an implementation, the time in which an action is undertaken may be established with reference to the beginning time of the time period or ending time of the time period in a batch auction implementation. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an implementation, the electronic message may also include other actions to be taken with respect to the order. These other actions may be actions to be executed after the initial or primary action associated with the order. For example, the actions may involve modifying or canceling an already placed order. Further, in an implementation, the other data may indicate order modification characteristics. For example, the other data may include a price or volume change in an order. The other actions may involve modifying the already placed order to align with the order modification characteristics, such as changing the price or volume of the already placed order.

In an implementation, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an implementation, the action, or a primary action, associated with an order may be executed. For example, an order extracted from electronic message order characteristics may be placed into a market, or an electronic order book for a market, such that the order may be matched with other order counter thereto.

In an implementation involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an implementation, the action may be executed at the particular time. For example, in an implementation involving a batch auction process having sub-periods during an order accumulation period, an order may be placed during a specified sub-period of the order accumulation period. The disclosed implementations may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an implementation, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In various implementations, the execution of temporally specific messages may be controlled by the electronic trading system such that a limited or maximum number may be executed in any particular accumulation period, or sub-period. In an implementation, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In various implementations, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an implementation involving a market operating on batch auction principles, the event may be detected subsequent to the execution of a first action, placing an order, but prior to the ending time of an order accumulation period in which the action was executed.

In various implementations, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an implementation, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In various implementations, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an implementation, the financial product may be based on an associated financial instrument which the electronic market is established to trade.

In various implementations, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In various implementations, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be saved. The data may be stored in any device, or using any technique, operable to store and provide recovery of data. For example, a memory 204 or computer readable medium 210, may be used to store data, as is described above with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book database, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transactions from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed implementations recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary implementations, all transactions for a particular market may be ultimately received at the electronic trading system via one or more points of entry, e.g., one or more communications interfaces, at which the disclosed implementations apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

In various implementations, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request operation is passed to the transaction processing system, e.g., the match engine.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one implementation, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Stop orders also rest on, or are maintained in, an order book to monitor for a trade at the stop price, which triggers an attempted trade at the limit price. In one implementation, a triggered limit price for a stop order may be treated as an incoming order in some of the methods described herein.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time

Order Level Pro Rata

Order Level Priority Pro Rata

Preference Price Explicit Time

Preference Order Level Pro Rata

Preference Order Level Priority Pro Rata

Threshold Pro-Rata

Priority Threshold Pro-Rata

Preference Threshold Pro-Rata

Priority Preference Threshold Pro-Rata

Split Price-Time Pro-Rata

For example, the Price Explicit Time trading policy is based on the basic Price Time trading policy with Explicit Orders having priority over Implied Orders at the same price level.

The order of traded volume allocation at a single price level may therefore be:

Explicit order with oldest timestamp first. Followed by

Any remaining explicit orders in timestamp sequence (First In, First Out—FIFO) next. Followed by Implied order with oldest timestamp next. Followed by Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.

2. Sort the list by order size, largest order size first. If equal order sizes, oldest timestamp first. This is the matching list.

3. Find the 'Matching order size, which is the total size of all the orders in the matching list.

4. Find the 'tradable volume', which is the smallest of the matching volume and the volume left to trade on the incoming order.

5. Allocate volume to each order in the matching list in turn, starting at the beginning of the list. If all the tradable volume gets used up, orders near the end of the list may not get allocation.

6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.

2. Sort the list by explicit time priority, oldest timestamp first. This is the matching list.

3. Find the 'Matching volume', which is the total volume of all the orders in the matching list.

4. Find the 'tradable volume', which is the smallest of the matching volume and the volume left to trade on the incoming order.

5. Allocate volume to each order in the matching list in turn, starting at the beginning of the list.

6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable

2. Preference allocation, if applicable

3. Price Time allocation of the configured percentage of incoming volume

4. Threshold Pro-Rata allocation of any remaining incoming volume

5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed implementations, and all such algorithms are contemplated herein. In one implementation, the disclosed implementations may be used in any combination or sequence with the allocation algorithms described herein.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed implementations may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying legs. Implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed implementations may be implemented in a data transaction processing system that processes data items or objects. Customer or user devices (e.g., computers) may submit electronic data transaction request messages to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers.

The various implementations may automatically perform a corrective action, e.g., halt or release the matching processor depending on the state of the system and/or the contents of the electronic data transaction request messages. For example, upon detecting an undesirable condition within the data transaction processing system, the velocity logic, as discussed above, may cause halting of the matching processor, which prevents the matching processor from matching messages, e.g., places the system or data objects related to the undesirable condition in a request halt or other reserved state. After the passage of time, receipt of a number of messages, or some other predetermined condition, the velocity detection and mitigation system may release the matching processor, or allow the matching processor to resume matching messages.

The various implementations effectively periodically sample, derive or otherwise measure a parameter indicative of the market value of a product, such as a futures contract, which may be represented as a data object within a data transaction processing system. The market for the product may also be referred to as an order book, which may be stored as a data structure within the memory of the data transaction processing system. Parameters indicative of the market value include the most recent price at which a trade was matched or quantity associated therewith, the most recently received, i.e. via an incoming order, bid price or quantity associated therewith, the most recently received, i.e. via an incoming order, ask price or quantity associated therewith, the current lowest ask price for an unmatched trade order resting in the order book or quantity associated therewith, the current highest bid price for an unmatched trade order resting in the order book or quantity associated therewith, combinations thereof or derivations therefrom, such as volatility, average, difference from historical values or other parameter, statistical or otherwise, indicative of the conditions under which the market is operating. When monitoring price based parameters, the values associated therewith may be measured in ticks, points or other metric. Time may be measured, as an overall elapse of time from an origin and/or between defined events, in second or milliseconds, or other increment. When sampling, deriving or otherwise measuring a parameter that is derived from an incoming trade order, such as the order price, every trade may be sampled or otherwise analyzed for comparison as will be described.

In various implementations, incoming messages that contain request operations may be analyzed to detect whether the incoming message are inaccurate. The detect inaccurate messages, the messages filtered in accord with multiple bands. As an illustrative example, a request operation for a "related" object may be filtered in accord with a related band (the related band being determined based on valid request operations for the related object) and also filtered in accord with a base band (the related band being determined based on valid request operations for a base object, where the base object and related object have some type of commonality).

A band, as used herein, may include a group of values defined as being within the band, where value not within that group are outside the band. A band may include a continuous or discrete range of values (e.g., extending from a lower value to an upper value). A band may include a piecewise collection of non-contiguous ranges. For example, a band for a particular object may have multiple ranges corresponding to different actions that may be performed, where, for example, each different action has a defined range of accurate possible values that may differ from accurate possible values associated with a different action. Nevertheless, in some cases, ranges for different actions may overlap resulting in contiguous ranges for the different actions. As an illustrative example, an order for a buy action may overlap (at least in part) in accuracy range with a sell action. In this illustrative example, cases of partial overlap may result in determination that orders to buy at an anomalously high price are inaccurate, while orders to buy at an (even anomalously) low price may be assumed accurate. Similarly, in this illustrative example, cases of partial overlap may result in determination that orders to sell at an anomalously low price are inaccurate, while orders to buy at an (even anomalously) high price may be assumed accurate. Thus, only orders within the region of overlap between lower sell price and upper buy price may be allowed to match, while some orders outside this overlap range may still be allowed to be processed and/or placed in the order book database and the entirety of the two ranges together would itself be one continuous range.

In various implementations, the bands may be determined based on valid request operations. Thus, to later affect the determination of the band, a request operation would be within the band at the time that request operation is first processed. In some implementations, fewer than all valid request operations may be used in determination of the band. In some cases, the set of valid request operations used in determination of the band may be further constrained to exclude valid but unexecuted request operations. As an illustrative example, a buy order at a below average price may not necessarily be later matched to a sell order. Accordingly, the unmatched buy order may not necessarily be executed. Thus, in various implementations, such a buy order may be excluded from use in the determination of the band. Conversely, matched valid buy order (whether above-average or below-average in price) would be included in the determination of the band.

Figure 3:
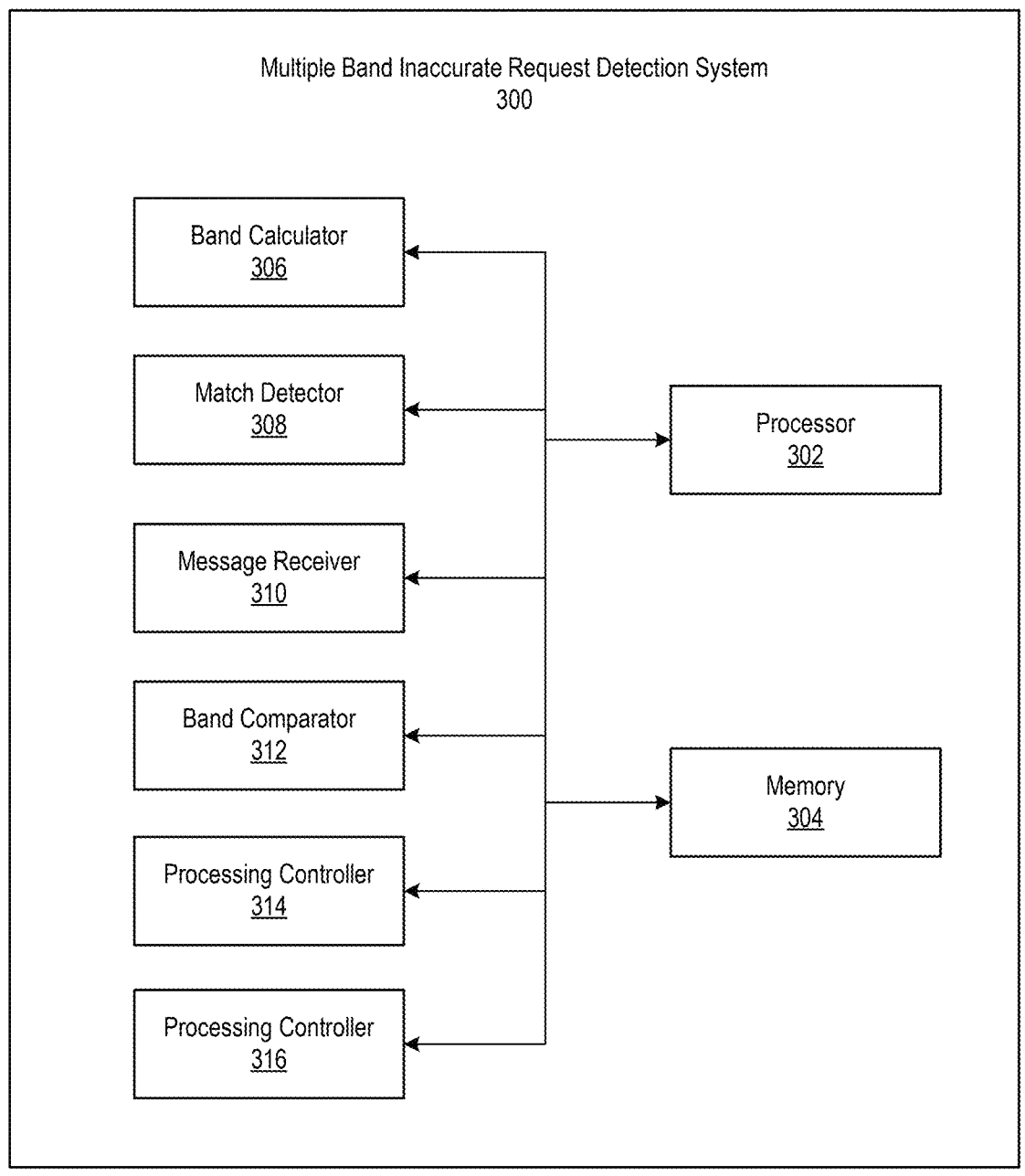
FIG. 3 shows an example system for multiple band detection of inaccurate request operations according to various implementations.

FIG. 3 shows an example system 300 for multiple band detection of inaccurate request operations. In various implementations the system 300 may implement band logic 400 discussed below. The system 300 includes a processor 302 and a memory 304 coupled therewith which may be implemented as a processor 202 and memory 204 as described with respect to FIG. 2. The processor 302 using instructions stored on the memory 304 may implement a band calculator 306, a match detector 308, a message receiver 310, message extractor 312, a band comparator 314, and a processing controller 316 to perform various functions of the band logic 400.

In various implementations, the example system may be used in an electronic trading system to detect inaccurate orders with instructions to transact at inaccurate prices. For example, the system 300 may be integrated into various modules of the system 100. For example, the system 300 may be implemented by any of or collectively by a match engine module 106, a message management module 140, and/or order processing module 136 of an exchange computing system 100. In some implementations where the system is used to abort processing before any attempt to match request operations is made, the system 300 may be implemented in the order extraction module 146 (e.g., within the message management module 140, as shown in FIG. 1A) and/or order processing module 136 and configured to abort processing a prevent forwarding to the match engine module 130. In some implementations where the system 300 is used to abort processing before any attempt to match request operations is made, the system 300 may still be implemented at least in part in initial stages of the match engine module 130 with processing being aborted before matching is attempted on inaccurate request operations.

While systems may gain technical benefits from the reduced processing associated with aborting inaccurate request operations prior to matching, some systems may implement band-based detection of inaccurate request operations and flag such request operations to facilitate further review but may allow execution of such inaccurate request operations, e.g., in lieu of aborting processing. Some systems may perform matching analysis on inaccurate request operations, but implement band-based detection to prevent subsequent execution of the inaccurate matched request operations, e.g., aborting processing after matching has occurred and/or as an independent computation thread. Allowing for a processing abort after matching has occurred may provide technical benefits associated with computation reductions gained from preventing execution of the inaccurate request operation. Further, such systems may allow inaccurate message detection to proceed as a separate processing thread so as to allow match processing to proceed without necessarily requiring that inaccurate message detection complete first. In some cases, the incidence of inaccurate messages may be low enough that, on average, the delay caused by wasted computational cycles associated with performing unused matches may be less than the delay associated with waiting for inaccurate message detection to complete before initiating match processing. Nevertheless, performing multiple match processes on a single request operation may create actual latency for that request operation and neighboring request operations in the match queue. The presence of such instantaneous latency may be more disruptive than a system that performs with slightly more average latency but constrains the actual latency experienced by any one request operation. Accordingly, in some cases, selection between requiring abort before match implementations and allowing abort after match implementations may be determined based on the technical performance requirements for latency of the particular application of the implementation. Further, allowing for a processing abort after match may interfere with batch processing schemes where multiple matches made in a batch may be affected if one match in the batch is later aborted.

In various implementations, the system 300 may be coupled to the order book module 110 and/or various market data feeds to have access to current parameters with which to determine current band values.

The processor 302, via the band calculator 306, may determine a base band for a base object and a related band for a related object. The base band may be based on valid previous request operations for the base object. In various implementations, the determination of the band may be made without regard to valid request operations for objects other than the base object. In such implementations, the determination of the base band may be insulated from inaccurate information that may affect other bands determined using request operations for other types of objects. In some cases, the processor may determine the base band by accessing previously calculated values for the base band from a separate system (e.g., in systems where request operations for the base object may be handled by a non-local and/or third-party system, systems where the base band management is performed outside a protected memory zone (or in a different protected memory zone), or other cases where the base band is determined on separate logic from, e.g., band logic executing on the system 300).

In some cases, determination of the base band may include accessing a stored parameter and determining the base band from the parameter. For example, the base band may be determined based on a center value. As an illustrative example of a center value, historical orders from a "base" product may be used to determine a fair market value (e.g., a statistically/analytically determined estimate of the price at which a given product is expected to transact, such as a median transaction price for a given period, and average transaction price for a given period, a transaction price determined by one or more pricing/risk models, or other center price). Such a fair market value may be used as a center value. Determining the band based on the center value may include various types of transformations and/or other calculations. In an example, the band may be determined as extending a predetermined amount above and below the center value. The amount may include a predetermined number of value increments (e.g., as price "ticks" above and below the center value), a statistically determined ranged such as some predetermined number (potentially including fractional numbers) of standard deviations, or other amount.

The processor 302, via the band calculator 306, may determine a related band for a related object. The related object and base object may share a relationship. As an illustrative example, the related and base objects may include contracts of differing size from the same commodity. For example, the related object may include contracts for "micro" crude oil, e.g., contracts for transactions for a first predetermined number of oil barrels, while the base object may include crude oil contracts for transactions for a second predetermined number of oil barrels greater than the first. Other relationship examples may include derivative contracts and contracts for the products underlying the derivative transactions, linked blockchain tokens (e.g., Gas and Ethereum), cloud-based database storage space reservations and cloud-based processing reservations (e.g., to establish the amount of database storage that can be obtained without obtaining additional processing power based on historical usage from previous database instances), or other objects having a defined relationship.

The related band may be determined based on valid request operations for the related object. For example, records of such request operations may be accessed via the order book module 110 and/or various market data feeds. In some cases, parameters of the related band and/or to support calculation of the related band may be determined as a portion of processing valid and/or executed request operations for the order book module 110 and/or market data feed.

In various implementations, the related band may be determined based on a center value determined using valid and/or executed request operations for the related object, statistical analysis, executed request operations for the related object, and/or other determinations used for base band or other bands (but rather applied to request operations for the related object). In some cases, the related band may be determined from a center value by defining the related band as extending a predetermined number of value increments above and/or below the center value. It will be appreciated that various other transformations for generating a range from a center value may be used to determine the related band.

The processor 302 may, via the message receiver 310, receive various incoming request operations from various network participants (e.g., peer-to-peer participants, network users, electronic trading system participants, and/or other participants). As discussed above, the request operations may arrive in a particular order and various priority schemes may be applied to determine the execution order for the request operations.

The processor 302 may, via the message extractor 312, initiate processing on the request operation to extract data indicative of value from the request message including the request operation. In some cases, the processor may further extract an instruction for the request operation, for example, in cases where the particular band to be applied to the request operation is dependent on the action requested in connection to the value.

In an illustrative example, a related object request operation may include an order to buy or sell a particular product. In the illustrative example, the value may include a price at which the buy/sell action is requested to be executed.

The processor 302, via the band comparator 314, may compare the extracted value to the related band to determine whether the to determine whether incoming request operation for the related object is inside or outside the related band. The request operation for the related object being within the related band when the extracted value is within the related band. Conversely, the request operation is outside the related band when the extracted value is outside the related band.

In implementations where the base band is also directly applied to request operations for the related object (e.g., dual-band application option or other multiple-band application options), the processor may compare the extracted value to the base band to determine whether the incoming request operation for the related object is inside or outside the base band. In such implementations, the request operation for the related object may be valid when the request operation is within both the related band and the base band. The related object may be invalid when the request operation outside the related band, the base band, or both. In some cases, the bands may be applied asymmetrically (e.g., the related band may not necessarily be applied to request operations for the base object). Accordingly, in some implementations using multiple-band application, the base band may be isolated from its determination being dependent on request operations for the related object (e.g., through application of the related band to base object request operations). When the bands are applied symmetrically, the related object request operations may affect the base band (at least indirectly) through application of the related band to the base object request operations.

In some implementations, a determination that a related request operation (e.g., a request operation for a related object) is outside one of the applied bands (or is otherwise invalid) may cause the processor 302 may implement the processing controller 316 to abort processing of the invalid related request operation.

Aborting processing may include affirmatively ending processing of a request operation before the processing which would have been performed on a similar valid request operation is completed. For example, a determination that a related request operation is outside either of the bands in a first analysis may result in aborting processing of the related request operation before the determination whether the related request operation is within the other completes. In some implementations, aborting processing may include preventing the related request operation from being provided to matching logic (e.g., such as the match engine module 106 and/or match detector 308) and/or preventing completion of a match. In some cases, aborting processing may include preventing execution of a related request operation after a match has been identified. In some implementations, preventing execution may include prevent a partial match of a related request operation when the partial match portion would be executed at values within the relevant bands (or at a value that would not cause above-threshold shift to the related band). Design of the system to disallow partial or whole matches that would be executed at values that would not be themselves identified as inaccurate may arise out of an aim of the system to identify inaccurate request operations rather than request operations that may have a particular effect on a market. Even in some cases where negative market effects may be otherwise mitigated or limited, inaccurate request operations may still be invalidated because the system may address error detection rather than market protection.

In various implementations, aborting processing may include omission or prevention of the execution of velocity logic and/or stop order logic. For example, a related request operation that may, if executed, cause invocation of velocity logic and/or stop order logic may be invalidated and barred from execution by the processor 302. Because inaccurate request operations cause out-of-band transactions and/or out-of-band band-to-band deviation, such request operations are also more likely than other request operations to cause invocation of velocity logic and/or stop order logic. Accordingly, in some cases, the use of banding logic, by removing inaccurate orders, may reduce unnecessary invocation of velocity logic and/or stop order logic rather than movement of measured consensus due to request operations that at least appear to be accurate. Because in some implementations, velocity logic and/or stop order logic may initiate anomalous condition messaging, the computation burden and messaging burden associated with their invocation may be pronounced. Thus, reducing and/or eliminating the reliance on velocity logic and/or stop order logic for handling responses to inaccurate request operations may provide a technical solution (e.g., the implementation of error detection) that solves technical problems (e.g., reductions in instantons computing load) and improves user experience (e.g., by reducing rejections of accurate request operations during request halts).

The disclosed implementations may also monitor certain messages or orders for products traded via the exchange computing system. The disclosed implementations may also monitor certain messages or orders for order books maintained on the exchange computing system. The products or order books may be represented as data objects within the exchange computing system. The monitored messages may be recently received messages (e.g., a limit price on a new incoming order, or a modification of a previous order), or recently triggered messages (e.g., a limit price in a stop order resting on the books that is triggered by a trade at the stop price).

In various implementations, the system 300 is coupled with the order books module 110 described above and monitors the relevant parameters of the order book maintained for the product. It will be appreciated that the system 300 may be coupled to other modules of the exchange computer system 100 so as to have access to the relevant parameters as described herein and initiate the requisite actions as further described. The disclosed implementations may be implemented separately for each market/order book to be monitored, such as a separate process or thread, or may be implemented as a single system for all markets/order books to be monitored thereby.

In various implementations, such as those relying on provisional execution of request operations, the system 300 further includes a match detector 308 stored in the memory 304 and executable by the processor 302 to cause the processor 302 to determine whether an electronic data transaction request message will cause or be involved in a match, and if so, whether some but not all (e.g., a partial match), or all (e.g., a full match) of the quantity associated with the electronic data transaction request message is matched. In other words, the match detector determines how much, if any, quantity of an electronic data transaction request message will match and at what value. The match detector then assigns the message value and/or any match values as comparison values to be checked, depending on whether the match detector detects a match at all, and if so, how much quantity associated with the electronic data transaction request message will match.

In some implementations, a value, such as a value defining band range, center value, or other value, may be updated or revised based on previous object values. When applied to an electronic trading system, a value may be a pre-defined threshold that is updated upon each elapse of duration of time based on an object's values during one or more previous elapses of durations of time.

In some implementations for use in markets for which outright orders (orders actually placed by a trader) as well as implied orders (orders generated by the Exchange based on outright orders placed in other markets, e.g. spread orders), may be received, only aggressor orders, i.e. outright orders, may be included in the derivation of the comparative values and further utilized as comparison values. In such implementations, received implied orders may be ignored when determining band values and/or center values.

In various implementations an object may include a financial product. The center value for this product may include, for example, a fair market price, a bid price of the product, an ask price of the product, a last traded price of the product, a last traded quantity of the product, a volatility of the product, or other market attribute value, or combination thereof. It will be appreciated that the value of the product may be determined according to other metrics of product value. Further, objects other than financial products may use these metrics and/or other metrics of object value.

In one implementation, the message receiver 310 and message extractor 312 are further executable by the processor 302 to cause the processor 302 to determine a value for an object as a value of each request operation to with an action for the object received during the elapse of a particular duration of time, e.g., over a particular interval. Thus, in some systems, the processor 302 may update band values and/or other values at a particular sampling frequency. It will be appreciated that fewer than all request operations may be included in the determination of the band, and that this sampling frequency may be configurable.

In various implementations, the system 300 may cause generation of conditional user interface elements at client devices to aide users in the use of the band system. The condition user interface elements may include temporarily displayed menu overlays, such as tooltips or other overlays, that appear when a user inputs a value that is within a predetermined threshold distance from a boundary of a band (e.g., when the input value is outside the band, is at an outer percentile (e.g., 10%) of values within band, and/or exceeds another threshold).

Figure 4:
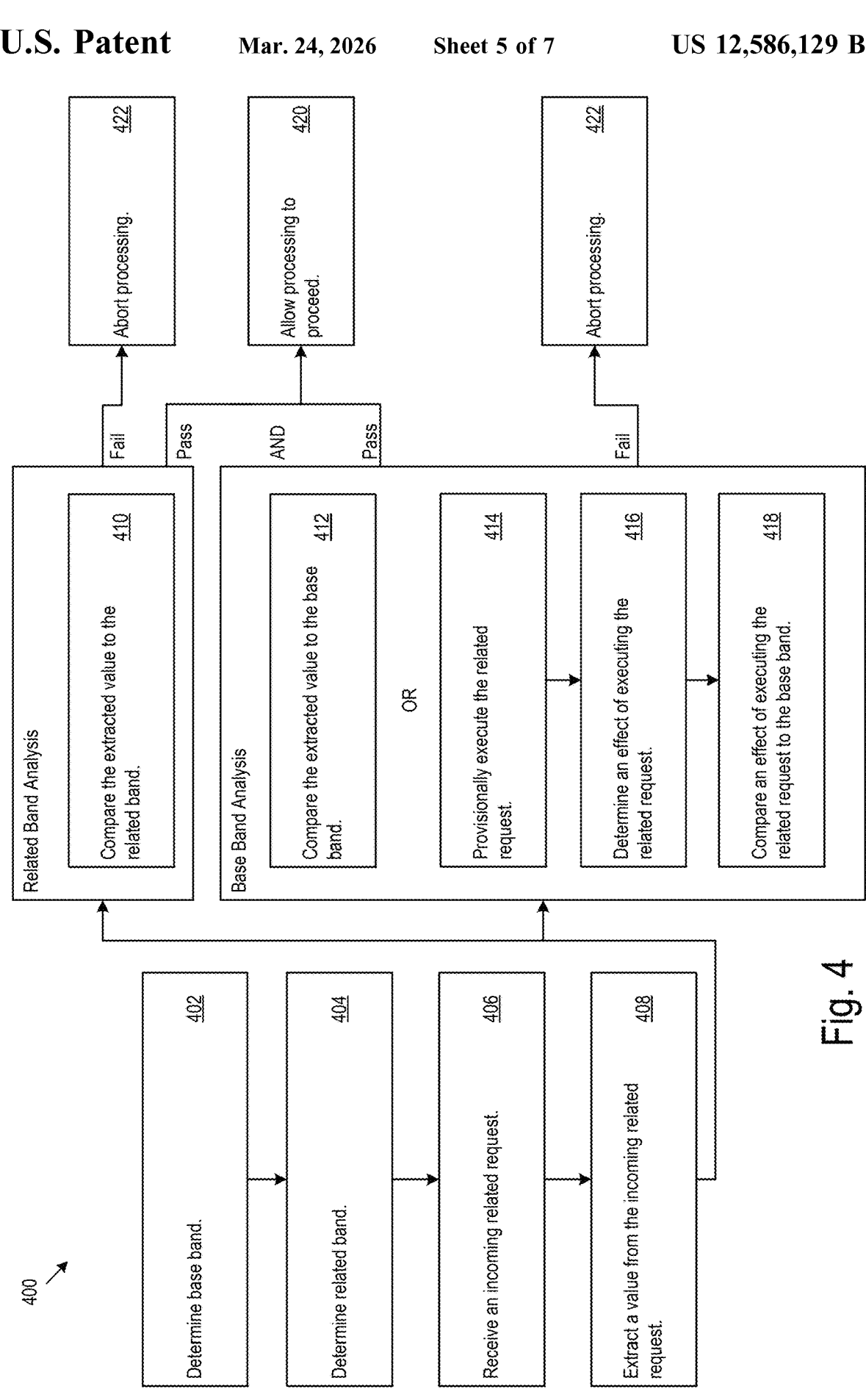
FIG. 4 shows example band logic according to various implementations.

FIG. 4 shows example band logic 400, which may be implemented on the system 300 and/or devices and computer networks such as those described with respect to FIGS. 1 and 2. Implementations may involve all, more or fewer actions indicated by the blocks of FIG. 4. The actions may be performed in the order or sequence shown or in a different sequence. In various implementations, the functions of the band logic 400 may be carried out by the risk management module 134 and/or match engine module 106.

In various implementations, the band logic 400 may be implemented on low latency processing hardware. To prevent post of request operations before detection of inaccurate request operations can be detected, the band logic may be executed before request instructions may be executed. Thus, band logic may execute on processing circuitry with processing latency lower than and/or commensurate with the other processing performed during request operation processing to successfully perform inaccurate request operation detection. In some implementations, low latency processing may include an average processing duration less than 10 milliseconds from initiation of band logic analysis on a request operation until a determination whether that request operation is inaccurate. However, various implementations may utilize shorter time scales, for example, microsecond, nanosecond, and/or sub-nanosecond processing durations.

As shown in block 402, the band logic 400 may determine a base band for a base object and a related band for a related object. The base band may be based on valid previous request operations for the base object. In various implementations, the determination of the band may be made without regard to valid request operations for objects other than the base object. In some cases, third-party data and/or system may be used to calculate the base band. Accordingly, the band logic 400 may determine the base band by accessing those calculated values. In some cases, determination of the base band may include accessing a stored parameter and determining the base band from the parameter. For example, the base band may be determined based on center value. Determining the band based on the center value may include various types of transformations and/or other calculations.

In some implementations, the bounds of the base band may be maintained by a separate system. Accordingly, in some implementations, the band logic 400 may have no role in the determination of the base band.

As shown in block 404, the band logic 400 may determine a related band for a related object. As discussed above in reference to FIG. 3, the related object and base object may share a relationship. The related band may be based on valid request operations for the related object. Accordingly, valid orders for the base object may affect the determination of the base band and valid orders for the related object may affect the related band. Further, through the enforcement of the base band on related object request operations, the constraint on how much the related band may deviate from the base band, and/or other multiple band enforcement, valid request operations for the base object may affect the determination of the related band.

As shown in block 406, the band logic 400 may receive various incoming request operations from various network participants. As shown in block 408, the band logic 400 may initiate processing on the request operation to extract a value from the request operation. In some cases, the processor may further extract an instruction for the request operation. For example, instructions may be extracted for the purposes of band comparison in cases where the particular band to be applied to the request operation is dependent on the action requested in connection to the value. Because the particular action may be extracted as a part of the subsequent match process, the action may be extracted (potentially along with one or more other parameters unused by the band logic 400) to consolidate the request extraction process into one stage. However, because the band logic 400 may invalidate a request operation resulting in a processing abort, the band logic 400 may, in some cases, constrain processor cycles dedicated to extraction until the request operation is confirmed to be valid. Accordingly, in some cases, extraction may focus on parameters used by the band logic 400.

As shown in block 410, the band logic 400 may compare the extracted value to the related band to determine whether the to determine whether incoming request operation for the related object is inside or outside the related band.

In implementations where the base band is directly applied to request operations for the related object (e.g., dual-band application option or other multiple-band application options) and as shown at block 412 the band logic 400 may compare the extracted value to the base band to determine whether the to determine whether incoming request operation for the related object is inside or outside the base band. In such implementations, the request operation for the related object may be valid when the request operation is within both the related band and the base band. The related object may be invalid when the request operation outside the related band, the base band, or both. In some cases, the bands may be applied asymmetrically (e.g., the related band may not necessarily be applied to request operations for the base object). Accordingly, in some implementations using multiple-band application, the base band may be isolated from its determination being dependent on request operations for the related object (e.g., through application of the related band to base object request operations). When the bands are applied symmetrically, the related object request operations may affect the base band (at least indirectly) through application of the related band to the base object request operations.

As an illustrative example scenario, an example related request operation to buy 200 related objects for 1900 tokens each may be received. In the example scenario, the base band and related band may be defined to extend 500 tokens above and below respective center values designing a "buy" transaction value for individual related objects. In the illustrative example scenario, the center value of the base band may be currently determined to be 1300 tokens for per related object and the current value of the related band center value may be determined to be 1500 tokens per related object. Accordingly, the base band may extend from 800 tokens to 1800 tokens, while the related band extends from 1000 tokens to 2000 tokens. In the example scenario, if the base band were compared first, the band logic 400 would determine that the example related request operation is outside the base band, 1900 tokens is not between 800 tokens and 1800 tokens. Accordingly, the example related request operation may be found to be invalid before the related request operation is compared to the related band. Alternatively, if the example related request operation is compared to the related band first, the example related request operation would be found to be within the related band (e.g., 1900 tokens is between 1000 tokens and 2000 tokens) and proceed to the base band comparison, where the example related request operation would be found to be outside the base band. The specific numbers and use of tokens above is for the purpose of illustration. Other band values and transaction value measures may be used in various other contexts.

In implementations where the base band is applied to constrain allowed effects of the execution of the related request operation and as shown at block 414, the band logic 400 may provisionally execute (e.g., execute in a reversible manner (which may include generating a provisional match for the request operation using a match engine, estimating results of execution, determining a maximum possible effect of execution (e.g., assume that the related request operation will be fully matched at the requested value), and/or otherwise revocably executing the related request operation). Using the provisionally executed related request operation, the band logic 400 may determine the effect of the related request operation on the related band and/or other parameter (e.g., a center value or other parameter affected by valid related request operations), as shown at block 416. The band logic may compare the resultant parameter to base band, as shown at block 418.

In some implementations relying on provisional execution of the related request operation, the comparison with the related band may occur prior to provisional execution. Provisional execution may be more computationally intensive than a direct band comparison. Accordingly, on average, a system that performs the direct band comparison first may have a reduced processing load compared to a system that performs provision execution of the related request operation first. Nevertheless in implementations where data privacy and/or other concerns outweigh the need for computational efficiency, provisional execution and base band comparison to the corresponding effects may be executed prior to a direct comparison of a value to the related band.

As an illustrative example scenario, an example related request operation to buy 200 related objects for 2000 tokens each may be received. In the example scenario, the base band and related band may be defined to extend 500 tokens above and below respective center values designing a "buy" transaction value for individual related objects. In the example scenario and for simplicity of illustration, the 200 related object may correspond to half of the total transactable related objects for the purposes of center value determination. Further, in the example scenario, the band logic may employ a maximum possible effect analysis that assumes that related request operation will be fully matched. Thus, in the example scenario the new center value from a provisional execution will be the average of the current center value and the "buy" value from the related request operation. In the illustrative example scenario, the center value of the base band may be currently determined to be 1300 tokens per related object and the current value of the related band center value may be determined to be 1700 tokens per related object. Accordingly, the base band may extend from 800 tokens to 1800 tokens, while the related band extends from 1200 tokens to 2200 tokens. In the example scenario, the related request operation is compared to the related band first. The example related request operation would be found to be within the related band (e.g., 2000 tokens is between 1200 tokens and 2200 tokens) and proceed to the band deviation comparison. In the example, the band logic may perform the provisional execution as prescribed above and determine that the effect of the example related request operation would be to shift the center value of the related band from 1700 tokens (which is within the base band) to 1850 tokens (which is not within the base band). Thus, the example related request operation would be found to violate the base band because of its out-of-baseband effect on the center value of the related band. The specific numbers and use of tokens above is for the purpose of illustration. Other band values and transaction value measures may be used in various other contexts.

When the related request operation (and in some implementations, its effects) are within both the base band and the related band, the band logic 400 may allow processing to proceed, as shown at block 420.

In some implementations, allowing processing to proceed may include an action such as forwarding the related request operation to a match engine, flagging the related request operation as valid, and/or flagging a provisional execution as allowable for finalized execution. In some implementations, allowing processing to proceed may include passive executions, such as declining to interrupt an in-progress match or execution process.

In some implementations, a determination that a related request operation (e.g., a request operation for a related object) is outside one of the applied bands (or is otherwise invalid) may cause the band logic 400 to abort processing of the invalid related request operation, as shown at block 422.

In some implementations, aborting processing may include an action such as, deleting the related request operation, sending a rejection notification message to a source of the related request operation, diverting the related request operation from addition to a match engine queue, flagging the related request operation as invalid, interrupting an in-progress match or execution process, preventing a partial match and/or execution of the related request operation, and/or flagging a provisional execution as unallowable for finalization. In some implementations, aborting processing may include passive executions, such as declining to provide an indication of validity needed before match and/or execution of the related request operation may proceed.

In various implementations, aborting processing may include omission or prevention of the execution of velocity logic and/or stop order logic. For example, a related request operation that may, if executed, cause invocation of velocity logic and/or stop order logic may be invalidated and barred from execution. Because inaccurate request operations cause out-of-band transactions and/or out-of-band band-to-band deviation, such request operations are also more likely than other request operations to cause invocation of velocity logic and/or stop order logic. Accordingly, in some cases, the use of banding logic, by removing inaccurate orders, may reduce unnecessary invocation of velocity logic and/or stop order logic. Because in some implementations, velocity logic and/or stop order logic may initiate anomalous condition messaging, the computation burden and messaging burden associated with their invocation may be pronounced. Thus, reducing and/or eliminating the reliance on velocity logic and/or stop order logic for handling responses to inaccurate request operations may provide a technical solution (e.g., the implementation of error detection) that solves technical problems (e.g., reductions in instantons computing load) and improves user experience (e.g., by reducing transaction rejections of accurate request operations during request halts).

Figure 5:
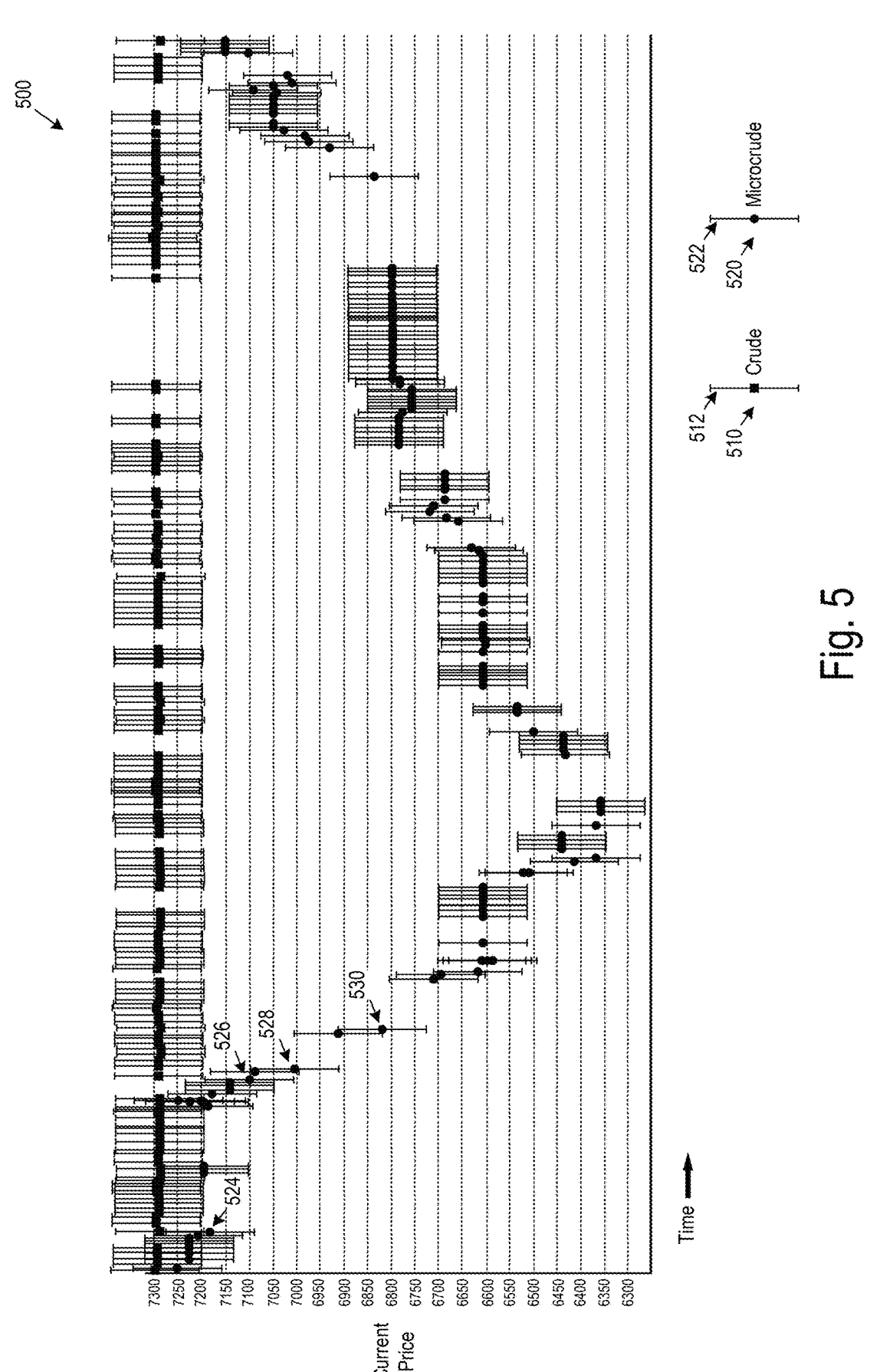
FIG. 5 shows an illustrative example trading instance with single band detection.

FIG. 5 shows an illustrative example trading instance 500 with single band detection. In the example trading instance 500, a sampling of current prices for two related products, crude 510 and microcrude 520, are shown. In between, each price sampling point one or more individual trades may occur. Individual trades are not shown. In the example trading instance 500, crude bands 512 and microcrude bands 522 are shown. The bands extend 100 "ticks" above and below the current trade price for respective products. However, because single band detection is applied, band deviation between crude and microcrude and/or orders that lead to such band deviation are allowed. In the illustrative example trading instance 500 the crude bands 512 are not used in the detection of inaccurate microcrude orders. Accordingly during the period shown, crude 510 and microcrude 520 deviate from one another in current price due to a transient non-consensus price shift in microcrude 520. Nevertheless, because the individual microcrude 520 transactions that cause the shown price shifts are internally consistent, the inaccurate orders due to the transient effect are not automatically detected. In the example trading instance 500, the velocity logic is invoked four times 524, 526, 528, 530 for microcrude 520 creating a significant computing and network traffic burden.

Figure 6:
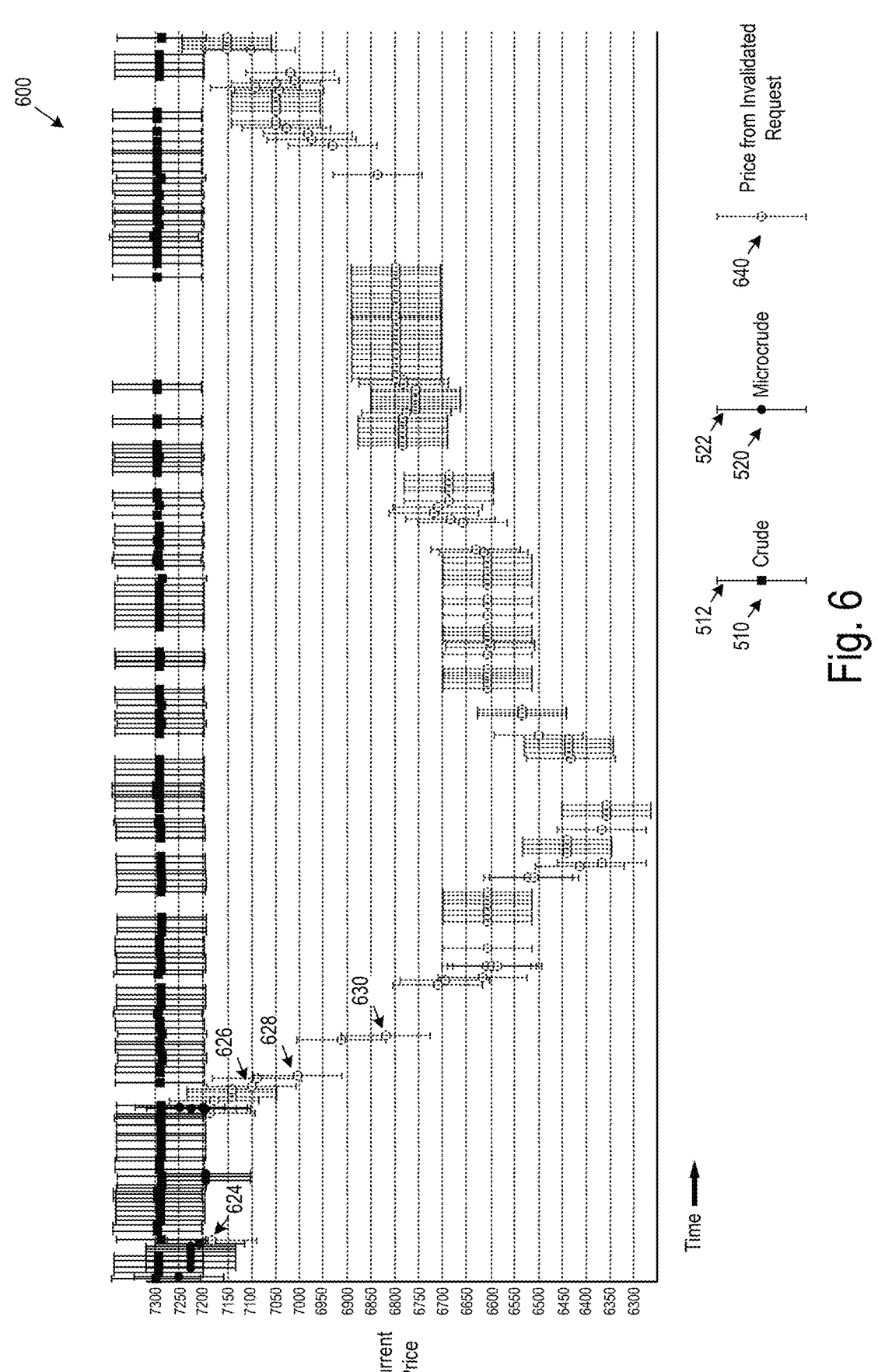
FIG. 6 shows illustrative the example trading instance shown in FIG. 5 with multiple band detection.

FIG. 6 shows illustrative the example trading instance 600 shown in FIG. 5 but with multiple band detection. In the example trading instance 600, the crude band 512 is used to detect inaccurate microcrude orders. In the example trading instance 600 the order than would have caused the first velocity logic invocation 524 is invalidated based on the crude band 512. Any order that pulls the current price of microcrude 520 more than 100 ticks off of the previous price of crude 510, must itself be a transaction that takes place more than 100 ticks off of the price of crude (a transaction price can only cause the current price to move toward that transaction price). Thus, both band deviation and dual band application algorithms would operate to invalidate the order causing the price shift for the first velocity logic invocation 624 and each of the example subsequent invocations of the velocity logic 626, 628, 630. The multiple band detection algorithms prevent the subsequent deviation holding the current price of microcrude 520 at the edge of the crude band 512. The prices 640 resulting from the invalidated orders do not take effect.

Table 1 includes various examples.

TABLE 1: EXAMPLES

1. A computer implemented method including:
   determining, by a processor, a base value range based on a plurality of base electronic request messages including valid base request operations for a base object and without regard for related electronic request messages for a related object, base request operations being valid when within the base value range;
   determining, by the processor, a related value range, the related value range based on a plurality of related electronic request messages including valid related requested operations for the related object, related request operations being valid when within the base value range and the related value range;

receiving, by the processor and via an electronic communications network, an incoming related electronic request message including an incoming related request operation that is within the related value range;

extracting, by the processor, data indicative of value for the incoming related request operation from the incoming related electronic request message;

comparing, by the processor, the data indicative of value to the base value range to determine that the incoming related request operation is outside of the base value range and is therefore invalid; and aborting, based on determining that the incoming related request operation is outside of the base value range, processing of the incoming related request operation to prevent adjustment of the related value range in response to incoming related request operation, where:

optionally, the method is in accord with any other example in the table.

2. The method of any other example in the table, where:

the base value range is based on a base center value for the base object, the base center value based on values associated with the plurality of base electronic request messages including the valid base request operations; and the related value range is based on a related center value for the related object, the related center value based on values associated with the plurality of related electronic request messages including the valid related requested operations.

3. The method of example 2 or any other example in the table, where:

the base value range extends a predetermined number of value increments above and below the base center value; and the related value range extends the predetermined number of value increments above and below the related center value.

4. The method of any other example in the table, further including determining that the incoming related request operation is within of the related value range.

5. The method of any other example in the table, further including:

receiving, by the processor and via the electronic communications network, a second incoming related electronic request message including a second incoming related request operation that is within the related value range and the base value range;

processing the second incoming related request operation by:

determining that the second incoming related request operation is within the base value range;

determining that the second incoming related request operation is within the related value range; and invoking velocity logic based on the second incoming related request operation, the velocity logic configured to, when invoked, execute anomalous condition messaging to effect, at least in part, a request halt for the related object.

6. The method of any other example in the table, where aborting the processing of the incoming related request operation includes preventing partial matching of the incoming related request operation that results in a partial satisfaction the incoming related request operation within the base value range.

7. The method of any other example in the table, where aborting the processing of the incoming related request operation includes preventing the incoming related request operation from being forwarded to a match engine for match to a counterpart request operation.

8. The method of any other example in the table, where aborting the processing of the incoming related request operation includes preventing entry of the incoming related request operation in an order book database for a financial products market.

9. A system including:

an electronic communications network;

a processor in data communication with the electronic communications network; and memory including executable instructions configured to cause the processor to:

determine a base value range based on a plurality of base electronic request messages including valid base request operations for a base object and without regard for related electronic request messages for a related object, base request operations being valid when within the base value range;

determine a related value range, the related value range based on a plurality of related electronic request messages including valid related requested operations for the related object, related request operations being valid when within the base value range and the related value range;

invoke, when the related value range undergoes an above-threshold adjustment, velocity logic, the velocity logic configured to, when invoked, execute anomalous condition messaging to effect, at least in part, a request halt for the related object;

receive, via the electronic communications network, one or more incoming related electronic request messages including one or more incoming related request operations within the related value range, the one or more incoming related request operations having an effect corresponding to the above-threshold adjustment;

extract data indicative of value for the one or more incoming related request operations from the one or more incoming related electronic request messages;

compare the data indicative of value to the base value range to determine that each of the one or more incoming related request operations are outside of the base value range; and invalidate, based on determining that each of the one or more incoming related request operations are outside of the base value range, the one or more incoming related request operations and thereby prevent invocation of the velocity logic, where:

optionally, the system is in accord with any other example in the table.

10. The system of any other example in the table, where the above-threshold adjustment includes a change in a related center value of the related object above a threshold magnitude defined based on a time interval within which the change to the related center value occurs.

11. The system of any other example in the table, where the request halt for the related object includes rejection of any new electronic request messages for the related object for a duration of the request halt.

12. The system of example 11 or any other example in the table, where the anomalous condition messaging includes:

first messaging to indicate application of the request halt to one or more client nodes on the electronic communications network; and second messaging to sources for any such new electronic request messages for the related object to provide notification of rejection.

13. The system of any other example in the table, where:

the base object includes contract for a first volume of an asset; and the related object includes a contract for a second volume of the asset, the second volume different than the first volume.

14. The system of any other example in the table, where the executable instructions are further configured to cause the processor to abort processing of the one or more incoming related request operations to invalidate the one or more incoming related request operations.

15. The system of any other example in the table, where the executable instructions are further configured to cause the processor prevent entry of the one or more incoming related request operations in an order book database for a financial products market to invalidate the one or more incoming related request operations.

16. A system including:

means for determining a base value range based on a plurality of valid base electronic request messages including base request operations for a base object and without regard for valid related electronic request messages for a related object, base request operations being valid when within the base value range;

means for determining a related value range, the related value range based on a plurality of valid related electronic request messages including related requested operations for the related object, related request operations being valid when within the base value range and the related value range;

means for invoking, when the related value range undergoes an above-threshold adjustment, velocity logic, the velocity logic configured to, when invoked, execute anomalous condition messaging to effect, at least in part, a request halt for the related object;

means for receiving, via an electronic communications network, one or more incoming related electronic request messages including one or more incoming related request operations within the related value range, the one or more incoming related request operations having an effect corresponding to the above-threshold adjustment;

means for extracting data indicative of value for the one or more incoming related request operations from the one or more incoming related electronic request messages;

means for comparing the data indicative of value to the base value range to determine that each of the one or more incoming related request operations are outside of the base value range and are therefore invalid; and means for invalidating, based on determining that each of the one or more incoming related request operations are outside of the base value range, the one or more incoming related request operations and thereby prevent invocation of the velocity logic, where:

optionally, the system is in accord with any other example in the table.

17. The system of any other example in the table, where the above-threshold adjustment includes a change in a related center value of the related object above a threshold magnitude defined based on a time interval within which the change to the related center value occurs.

18. The system of any other example in the table, where the request halt for the related object includes rejection of any new electronic request messages for the related object for a duration of the request halt.

19. The system of example 18 or any other example in the table, where the anomalous condition messaging includes:

first messaging to indicate application of the request halt to one or more client nodes on the electronic communications network; and second messaging to sources for any such new electronic request messages for the related object to provide notification of rejection.

20. The system of any other example in the table, where:

the base object includes contract for a first volume of an asset; and the related object includes a contract for a second volume of the asset, the second volume different than the first volume.

21. The system of any other example in the table, further including means for invalidating the one or more incoming related request operations includes means for preventing the one or more incoming related request operations from being forwarded to a match engine for match to one or more counterpart request operations.

22. A system including a processor configured to perform the method of any other example in the table.

23. A product including:

a machine-readable medium; and instructions stored on the machine-readable medium, the instructions configured to cause a processor to perform the method of any other example in the table, where:

optionally, the instructions are executable;

optionally, the machine-readable medium is non-transitory optionally, the machine-readable medium is other than a transitory signal.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features of particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method including:
determining, by a processor, a base value range based on a plurality of base electronic request messages including valid base transaction requests for a base product and without regard for any transactions for a related product different from the base product, base transaction requests being valid when within the base value range;
determining, by the processor, a related value range, the related value range based on a plurality of related electronic request messages including valid related transaction requests for the related product, related transaction requests being valid when within both the base value range and the related value range;

receiving, by the processor and via an electronic communications network, an incoming related electronic request message including an incoming related transaction request;
extracting, by the processor, data indicative of value for the incoming related transaction request from the incoming related electronic request message;
storing the data indicative of value in a first memory location;
comparing, by the processor in a first range comparison operation on the first memory location, the data indicative of value to the base value range to determine that the incoming related transaction request is outside of the base value range and is therefore invalid;
comparing, by the processor in a second range comparison operation on the first memory location, the data indicative of value to the related value range to determine whether the incoming related transaction request is inside of the related value range; and
aborting, based on determining that the incoming related transaction request is outside of the base value range, processing of the incoming related transaction request to prevent adjustment of the related value range in response to incoming related transaction request.

2. The method of claim 1, where:
the base value range is based on a base center value for the base product, the base center value based on values associated with the plurality of base electronic request messages including the valid base transaction requests; and
the related value range is based on a related center value for the related product, the related center value based on values associated with the plurality of related electronic request messages including the valid related transaction requests.

3. The method of claim 2, where:
the base value range extends a predetermined number of value increments above and below the base center value; and
the related value range extends the predetermined number of value increments above and below the related center value.

4. The method of claim 1, wherein determining whether the incoming related transaction request is within the related value range includes determining that the incoming related transaction request is within the related value range; and
the method further includes proceeding, after comparison with the related value range, to execute comparison with the base value range in lieu of aborting processing of the incoming related transaction request based on comparison with the related value range alone.

5. The method of claim 1, further including:
receiving, by the processor and via the electronic communications network, a second incoming related electronic request message including a second incoming related transaction request that is within the related value range and the base value range;
processing the second incoming related transaction request by:
determining that the second incoming related transaction request is within the base value range;
determining that the second incoming related transaction request is within the related value range; and
invoking velocity logic based on the second incoming related transaction request, the velocity logic configured to, when invoked, execute anomalous condition messaging to effect, at least in part, a request halt for the related product.

6. The method of claim 1, where aborting the processing of the incoming related transaction request includes preventing partial matching of the incoming related transaction request that results in a partial satisfaction of the incoming related transaction request within the base value range.

7. The method of claim 1, where aborting the processing of the incoming related transaction request includes preventing the incoming related transaction request from being forwarded to a match engine for match to a counterpart transaction request.

8. The method of claim 1, where aborting the processing of the incoming related transaction request includes preventing entry of the incoming related transaction request in an order book database for a financial products market.

9. A system including:

an electronic communications network;

a processor in data communication with the electronic communications network; and memory including executable instructions configured to cause the processor to:

determine a base value range based on a plurality of base electronic request messages including valid base transaction requests for a base product and without regard for any transactions for a related product different from the base product, base request transactions being valid when within the base value range;

determine a related value range, the related value range based on a plurality of related electronic request messages including valid related transaction requests for the related product, related transaction requests being valid when within both the base value range and the related value range;

invoke, when the related value range undergoes an above-threshold adjustment, velocity logic, the velocity logic configured to, when invoked, execute anomalous condition messaging to effect, at least in part, a request halt for the related product;

receive, via the electronic communications network, one or more incoming related electronic request messages including one or more incoming related transaction requests within the related value range, the one or more incoming related transaction requests having an effect corresponding to the above-threshold adjustment;

extract data indicative of value for the one or more incoming related transaction requests from the one or more incoming related electronic request messages;

store the data indicative of value in a first memory location;

compare, in a first range comparison operation on the first memory location, the data indicative of value to the base value range to determine that each of the one or more incoming related transaction requests are outside of the base value range;

compare, in a second range comparison operation on the first memory location, the data indicative of value to the related value range to determine whether the incoming related transaction request is inside of the related value range; and invalidate, based on determining that each of the one or more incoming related transaction requests are outside of the base value range, the one or more incoming related transaction requests and thereby prevent invocation of the velocity logic.

10. The system of claim 9, where the above-threshold adjustment includes a change in a related center value of the related product above a threshold magnitude defined based on a time interval within which the change to the related center value occurs.

11. The system of claim 9, where the request halt for the related product includes rejection of any new electronic request messages for the related product for a duration of the request halt.

12. The system of claim 11, where the anomalous condition messaging includes:

first messaging to indicate application of the request halt to one or more client nodes on the electronic communications network; and second messaging to sources for any such new electronic request messages for the related product to provide notification of rejection.

13. The system of claim 9, where:

the base product includes contract for a first volume of an asset; and the related product includes a contract for a second volume of the asset, the second volume different than the first volume.

14. The system of claim 9, where the executable instructions are further configured to cause the processor to abort processing of the one or more incoming related transaction requests to invalidate the one or more incoming related transaction requests.

15. The system of claim 9, where the executable instructions are further configured to cause the processor to prevent entry of the one or more incoming related transaction requests in an order book database for a financial products market to invalidate the one or more incoming related transaction requests.

16. A system including:

means for determining a base value range based on a plurality of valid base electronic request messages including base transaction requests for a base product and without regard for any transactions for a related product different from the base product, base transaction requests being valid when within the base value range;

means for determining a related value range, the related value range based on a plurality of valid related electronic request messages including related transaction requests for the related product, related transaction requests being valid when within both the base value range and the related value range;

means for invoking, when the related value range undergoes an above-threshold adjustment, velocity logic, the velocity logic configured to, when invoked, execute anomalous condition messaging to effect, at least in part, a request halt for the related product;

means for receiving, via an electronic communications network, one or more incoming related electronic request messages including one or more incoming related transaction requests within the related value range, the one or more incoming related transaction requests having an effect corresponding to the above-threshold adjustment;

means for extracting data indicative of value for the one or more incoming related transaction requests from the one or more incoming related electronic request messages;

means for storing the data indicative of value in a first memory location;

means for comparing, in a second range comparison operation on the first memory location, the data indicative of value to the base value range to determine that each of the one or more incoming related transaction requests are outside of the base value range and are therefore invalid;

means for comparing, in a second range comparison operation on the first memory location, the data indicative of value to the related value range to determine whether the incoming related transaction request is inside of the related value range; and means for invalidating, based on determining that each of the one or more incoming related transaction requests are outside of the base value range, the one or more incoming related transaction requests and thereby prevent invocation of the velocity logic.

17. The system of claim 16, where the above-threshold adjustment includes a change in a related center value of the related product above a threshold magnitude defined based on a time interval within which the change to the related center value occurs.

18. The system of claim 16, where the request halt for the related product includes rejection of any new electronic request messages for the related product for a duration of the request halt.

19. The system of claim 18, where the anomalous condition messaging includes:

first messaging to indicate application of the request halt to one or more client nodes on the electronic communications network; and second messaging to sources for any such new electronic request messages for the related product to provide notification of rejection.

20. The system of claim 16, where:

the base product includes contract for a first volume of an asset; and the related product includes a contract for a second volume of the asset, the second volume different than the first volume.

21. The system of claim 16, further including means for invalidating the one or more incoming related transaction requests includes means for preventing the one or more incoming related transaction requests from being forwarded to a match engine for match to one or more counterpart transaction requests.

* * * * *